US008014035B2

(12) United States Patent
Monga et al.

(10) Patent No.: US 8,014,035 B2
(45) Date of Patent: Sep. 6, 2011

(54) DECODING MESSAGE DATA EMBEDDED IN AN IMAGE PRINT VIA HALFTONE DOT ORIENTATION

(75) Inventors: Vishal Monga, Webster, NY (US); Gaurav Sharma, Webster, NY (US); Orhan Bulan, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 510 days.

(21) Appl. No.: 12/207,718

(22) Filed: Sep. 10, 2008

(65) Prior Publication Data
US 2010/0060943 A1 Mar. 11, 2010

(51) Int. Cl.
*H04N 1/405* (2006.01)
*G06T 7/60* (2006.01)
*G06K 9/46* (2006.01)
*G06K 9/52* (2006.01)
*G06K 9/56* (2006.01)
*B41M 3/14* (2006.01)

(52) U.S. Cl. ....... 358/3.28; 358/3.06; 358/3.2; 382/168; 382/195; 382/205; 382/286; 382/288; 382/289

(58) Field of Classification Search .................. 358/3.06, 358/3.09, 3.11, 3.2, 3.28, 1.14, 464; 382/100, 382/195, 203, 228, 286, 288, 168, 205, 280, 382/289
See application file for complete search history.

(56) References Cited

U.S. PATENT DOCUMENTS

| 4,149,183 | A | 4/1979 | Pellar et al. |
| 4,149,194 | A | 4/1979 | Holladay |
| 4,196,151 | A | 4/1980 | Suyama et al. |
| 4,196,451 | A | 4/1980 | Pellar |
| 5,045,952 | A | 9/1991 | Eschbach |
| 5,226,094 | A | 7/1993 | Eschbach |
| 5,608,821 | A | 3/1997 | Metcalfe et al. |
| 5,673,121 | A | 9/1997 | Wang |
| 5,689,587 | A | 11/1997 | Bender et al. |
| 6,252,971 | B1 | 6/2001 | Wang |
| 6,694,041 | B1 | 2/2004 | Brunk |
| 6,754,365 | B1 * | 6/2004 | Wen et al. ..................... 382/100 |
| 2005/0068588 | A1 | 3/2005 | Lieberman |
| 2008/0019559 | A1 | 1/2008 | Wang et al. |

(Continued)

OTHER PUBLICATIONS

Divsalar, et al., "Coding Theorems for 'Turbo-Like' Codes," Proc. 36th Annual Allerton Conference on Communications, Controls, and Computing, pp. 201-210, (Monticello, IL, USA), Sep. 1998.

(Continued)

*Primary Examiner* — Scott A Rogers
(74) *Attorney, Agent, or Firm* — Philip E. Blair; Fleit Gibbons Gutman Bongini & Bianco P.L.

(57) ABSTRACT

What is disclosed is a novel system and method for encoding/decoding data in a cover contone image via halftone dot orientation modulation. Arrays of halftone threshold values are used to determine a desired orientation, e.g. 0/90°+/−45° for a given single data value of the original message to be embedded. Message data is embedded as a function of halftone dot orientation. Detection modeling of the print-scan process enables the determination of dot orientation from the image scan via statistically motivated image moments. A probabilistic model of the print-scan channel conditions received moments on input orientation. Density values of the received moments are used to determine dot orientation for each halftone cell. The embedded data is retrieved based on the determined orientations. The present method is applicable to areas of data embedding, document security, and the like.

20 Claims, 17 Drawing Sheets

U.S. PATENT DOCUMENTS

2009/0323127 A1* 12/2009 Oosawa .................. 358/401
2010/0282851 A1* 11/2010 Bulan et al. ............. 235/462.11
2010/0282856 A1* 11/2010 Bulan et al. .............. 235/494

OTHER PUBLICATIONS

Jin, et al., "Irregular Repeat-Accumulate Codes," Proc. 2nd International Symposium on Turbo Codes and Related Topics, pp. 1-8, (Brest, France), Sep. 2000; (8 pages).

Hecht, David L., "Printed Embedded Data Graphical User Interfaces," IEEE Computer, pp. 47-55, IEEE 0018-9162, Mar. 2001.

Solanki, et al., "Modeling the Print-Scan Process for Resilient Data Hiding," Security, Steganography, and Watermarking of Multimedia Contents VII, Proc. of SPIE-IS&T Electronic Imaging, vol. 5681, pp. 418-429, Mar. 2005.

Damera-Venkata, et al., "Hardcopy Image Barcodes Via Block-Error Diffusion," IEEE Transactions on Image Processing, vol. 14, No. 12, pp. 1977-1989, Dec. 2005.

Oztan, et al., "Continuous Phase Modulated Halftones and Their Application to Halftone Data Embedding," Proc. of the IEEE International Conference on Acoustics, Speech, and Signal Proc. (ICASSP), vol. II, pp. 333-336, (Toulouse, France), May 2006.

Oztan, et al., "Self-Modulated Halftones," Proc. of the IEEE International Conference on Image Processing (ICIP), pp. 1533-1536, (Atlanta, GA, USA), Oct. 2006.

Solanki, et al., "'Print and Scan' Resilient Data Hiding in Images," IEEE Transactions on Information Forensics and Security, vol. 1, No. 4, pp. 464-478, Dec. 2006.

Bulan, et al., "Adaptive Decoding for Halftone Orientation-Based Data Hiding," submitted to IEEE International Conference on Image Processing, (San Diego, CA, USA) for presentation Oct. 2008; (4 pages).

Bulan, et al., "Data Embedding in Hardocpy Images Via Halftone-Dot Orientation Modulation," Department of Electrical and Computer Engineering, University of Rochester, Rochester, NY, 2008; (1 page).

Bulan, et al., "Data Embedding in Hardcopy Images Via Halftone-Dot Orientation Modulation," Security, Forensics, Steganography, and Watermarking of Multimedia Contents X, Proc. SPIE-IS&T Electronic Imaging, vol. 6819, pp. 1-11, Jan. 2008.

Bulan, et al., "On the Capacity of Orientation Modulation Halftone Channels," presented at IEEE International Conference on Acoustics, Speech, and Signal Processing, (Las Vegas, NV, USA) Mar. 30-Apr. 4, 2008.

Wong, et al., "Data Hiding and Watermarking in JPEG Compressed Domain by DC Coefficient Modification," Proc. of SPIE Sym. of Security and Watermarking of Multimedia Contents 2000, vol. 3971, pp. 237-244, (San Jose, CA, USA) Jan. 2000.

Pei, et al., "Novel Robust Watermarking Technique in Dithering Halftone Images,", IEEE Signal Proc. Letters, vol. 12, No. 4, pp. 333-336, Apr. 2005.

Moon, Todd K., "The Expectation Maximization Algorithm," IEEE Signal Processing Magazine, vol. 13, pp. 47-60, Nov. 1996.

Baharav, et al., "Watermarking of Dither Halftoned Images," HP Technical Report HPL-98-32, HP Labs Israel, pp. 307-316, May 1999.

\* cited by examiner

*800*

→ x
↓ y

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 1 | 1 | 1 | 1 | 1 | 1 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 1 | 1 | 1 | 1 | 1 | 1 | 1 | 1 | 1 | 1 | 0 | 0 | 0 |
| 0 | 0 | 0 | 1 | 1 | 1 | 1 | 1 | 1 | 1 | 1 | 1 | 1 | 0 | 0 | 0 |
| 0 | 0 | 0 | 1 | 1 | 1 | 1 | 1 | 1 | 1 | 1 | 1 | 1 | 0 | 0 | 0 |
| 0 | 0 | 0 | 1 | 1 | 1 | 1 | 1 | 1 | 1 | 1 | 1 | 1 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 |

(BINARY OUTPUT MASK)

*FIG. 8*

DECODING MESSAGE DATA EMBEDDED IN AN IMAGE PRINT VIA HALFTONE DOT ORIENTATION

CROSS REFERENCE TO RELATED APPLICATION

The present patent application is related to commonly owned U.S. patent application Ser. No. 12/207,704 entitled "Encoding Message Data In A Cover Contone Image Via Halftone Dot Orientation", filed on the same date herewith, the entire teachings of which being hereby incorporated by reference in its entirety.

TECHNICAL FIELD

The present invention is directed to systems and methods for watermarking which embed (encode) message data in an image and which extract (decode) the embedded message data from the scanned image print.

BACKGROUND

Watermarking is the process of embedding information into a signal without impacting its primary functionality. The signal may be audio, pictures or video, for example. Image watermarks are further classified as perceptible (visible to the naked eye in case of images) or imperceptible, and the particular choice is motivated by the application. See generally: *Digital Watermarking*, by: I. J. Cox, M. L. Miller, and J. A. Bloom, Morgan Kaufmann, (2001). Multimedia data hiding has been an active area of research with several emerging applications in content authentication, anti-piracy data hiding, and digital rights management.

Hardcopy watermarking or data hiding in images that is required to survive the print-scan (digital-analog-digital) process has come to receive significant attention recently. The fact that printed media comprises an increasing portion of official, legal and transactional data such as IDs, passports, contracts, and the like, makes the problem of considerable economic interest. Particular motivating applications lie in identifying where a hardcopy document originated, document integrity verification and copy protection for ensuring that copies of an original hardcopy are distinguishable and identifiable as such, copyright enforcement methods for identification of copyright ownership, and auxiliary data embedding such as web URLs, product UPC codes, etc. Hardcopy data hiding can be distinguished from other multimedia data hiding schemes by the presence of a print-scan process. Hardcopy data hiding schemes must adapt to the characteristics of the print-scan distortion channel.

One key component of the printing process is a bit-depth reduction step called digital halftoning which reduces the original continuous tone, typically 8 bits/pixel, image to a 1 bit/pixel binary image. Halftoning aims to produce an illusion of continuous tone by trading off amplitude resolution for spatial resolution. Algorithms for digital halftoning can be generally classified into three categories: 1) point processes, or screening methods; 2) neighborhood processes or error diffusion; and 3) iterative or search based methods. Of the above, screening (particularly clustered-dot) is dominant in xerographic printers, while error diffusion is used rather extensively in inkjet printers. Once printed, the image transitions to the analog domain, and can be re-digitized by scanning. For hardcopy data hiding, it should be noted that the input to the physical print-scan channel is a binary or halftone image and hence the distortions are tied to the nature of the halftoning algorithm employed.

Methods for data embedding in hardcopy images may be grouped into two categories. The first corresponds to robust embedding methods that are intended to survive printing and scanning but do not directly exploit characteristics of the printing process during embedding. The second corresponds to techniques that use the particular characteristics of the printing process (e.g. halftoning) for embedding. The exploitation of this specific knowledge typically offers greater potential for embedding and is better suited to hardcopy applications since the embedding occurs just prior to printing. The methods in the first category are limited by the lack of knowledge of the halftone print process. From a communications viewpoint, this adversely affects detection accuracy because the embedding does not adapt to the characteristics of the print-scan channel. Methods in the latter category require a manual visual detection/inspection process, e.g. by overlaying a pre-designed pattern directly over the hardcopy print. While this is useful for some applications such as document authentication, a large class of applications such as meta-data embedding, document tracking in workflows, and secure hiding in adversarial scenarios, are better enabled by automated data recovery. Methods which allow automated detection tend to perform embedding by modulating binary halftone outputs with pre-determined message signals to produce the watermarked image containing the embedded data. This can cause distortions in the output image even for modest embedding rate unless sufficient care is taken in the design of the embedding method.

Hardcopy data embedding techniques that allow automated extraction of the embedded data without involving a human observer are a key enabler for a wide variety of document security applications. Methods developed for this purpose can be categorized as data encoding or data hiding approaches. For methods in the former category, the data is embedded in a region of the printed page that is solely dedicated to the objective of conveying the information, the visual appearance of the encoded region being only a secondary concern. One and two-dimensional bar-codes are the predominant representatives of techniques in this class. Adaptations of these methods are also utilized for limited image rendering applications.

Methods for clustered-dot halftone pose significant challenges for data hiding methods. The requirement for a faithful reproduction of the original cover image can have irreconcilable conflicts with the ability to introduce a distinguishable change in the printed image for the purpose of embedding data. As a specific example, in regions where the cover image is white, the desired rendering is white (regions free of any printed dots), in which situation no discernible change can be incorporated. A similar conflict arises in regions where the cover image is black. In these scenarios, as is desirable for data hiding methods, embedding robustness must be relaxed in favor of cover image fidelity. Methods for data hiding in hardcopy image prints must carry the embedded data in a manner that minimally disrupts image content while still allowing data recovery at the decoding end. These can be challenging constraints.

Accordingly, what is needed in this art are increasingly sophisticated systems and methods for high capacity binarized message data embedding (and decoding) in a contone image which addresses the above-discussed problems in this art while achieving high embedding data rates.

BRIEF SUMMARY

What is provided are a novel system, method, and computer program product for encoding data in a contone image using halftone dot orientation. Analytic halftone threshold functions are used to produce screening-based clustered halftone dots for a given gray level in the image. The host signal, i.e. the gray level, is used in the mapping from the data message (binary symbol) to the embedded mark (dot orientation) space. Each unique state which a single data value of the original data message to be embedded is associated with a particular dot orientation defined with respect to a major axis of the elliptical dot, e.g. horizontal (0°), vertical (90°), diagonal (+/−45°), etc. Halftone dots in each uniform periodic tile of the contone image are generated using a halftone threshold array that has an orientation determined by the unique state of the single data value embedded in that cell. The image containing the oriented halftone dots is then rendered to an output device. On the decoding end, the image is scanned. Following local and global synchronizations which address geometric distortions introduced by the print-scan channel, orientation of each halftone dot of each periodic tile of the scanned image is estimated via statistically motivated image moments using a probabilistic model of the print-scan channel which specifically conditions received moments on input orientations. Error control coding is optionally incorporated in order to correct for errors introduced in this detection process. For each halftone cell, the computed image moments are utilized either: a) directly in order to estimate the dot orientation for the cell and thereby the single data value associated with the associated dot orientation or b) along with a probability density model for the image moments conditioned on the input orientations that provides a likelihood values for the possible dot orientations. The decoding component of the error control coding then estimates the embedded message from the collection of the individual single data values or their likelihood values. Given the inherent challenges in halftone data hiding, error control coding is inevitably necessary for most applications though, in limited cases, this step may be unnecessary and may be dropped.

In one example embodiment of the present method for data embedding via halftone dot orientation, a cover contone image having a plurality of contone data points comprising pixel intensity values is received. The data message to be embedded in the cover contone image comprises a plurality of single data values. Further, each single data value assumes only one unique state. Each of the unique states is associated with a unique orientation direction. The received image is partitioned into a periodic tiling. An array of threshold values is defined for each unique state and is designed to produce the associated dot orientation. Each of the threshold values in the threshold array is defined for a given screen frequency and dot shape. Each array of threshold values has a one-to-one correspondence with pixel intensity values encompassed by each periodic tile. A unique periodic tile wherein a single data value is to be encoded is identified for each data value of the original message to be embedded. For each identified tile wherein a single data value is to be encoded, each pixel intensity value in the current tile is compared with a corresponding value of the threshold array defined for the unique state of the single data value to be encoded in the current tile. Each comparison produces a binary output value for each pixel in the current tile. In one example, a binary output value of 1 defines a pixel being turned "ON" at that location in the current tile and a binary output value of 0 defines a pixel being turned "OFF" at that location. Turning pixels within a single cell ON/OFF enables the halftone dot of that cell to be printed with a particular orientation for the elliptical dot. All of the comparisons for the current tile produces a binary mask for that tile. All of the binary masks for all tiles produces a single mask for the image. The image is rendered according to the mask with each halftone dot of each tile assuming the desired dot orientation defined by that tile's binary mask. The output image thereafter contains the embedded original data message. Embodiments regarding error correction detection are disclosed.

In one example embodiment of the present method for decoding data embedded in an image via the above-described method of dot orientation, a printed image containing the embedded original message is scanned. The message encoded in the image comprises a plurality of single data values. Each single data value can assume only one of a plurality of possible unique states; each of the possible states is associated with a unique orientation direction with respect to a horizontal and vertical axis of the image. The scanned image is synchronized to compensate for geometric distortions introduced by the scan process. In one embodiment, the image is synchronized based on estimated global rotation and scaling factors computed from the estimated periodicity in the scanned halftone and from local estimates of variations in this periodicity. Each single data value of the message embedded in the scanned image print has only one unique state and each of the unique states is associated with a unique dot orientation as was used for encoding. The scanned image is partitioned into periodic tiles. For each of the periodic tiles in the scanned image, a plurality of image moments are calculated for the dot printed in the current tile. One image moment is calculated along each of the associated unique orientation directions. Embodiments for calculating image moments ($\sigma_x$, $\sigma_y$) for orientation directions along orthogonal x and y axis based on a computed center of mass for the halftone dot are provided. A largest of the calculated moments is used to identify an orientation direction for the dot in the current tile. The single data value in the current tile is decoded based on the unique state associated with the dot's determined predominant orientation direction. The original message embedded in the image print is reassembled from each unique state of each decoded single data value. Error correction can be performed on the decoded message or alternatively the estimated moments for the tiles can be collectively in an error correction decoding procedure to obtain an estimate of the message.

The foregoing and other features and advantages will be apparent from the following more particular description of the various embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 8 illustrates an example binary mask for the cell of FIG. 2A resulting from the comparison of the intensity values of FIG. 6 with each threshold value in the threshold array of FIG. 7;

DETAILED DESCRIPTION

Figure 1:
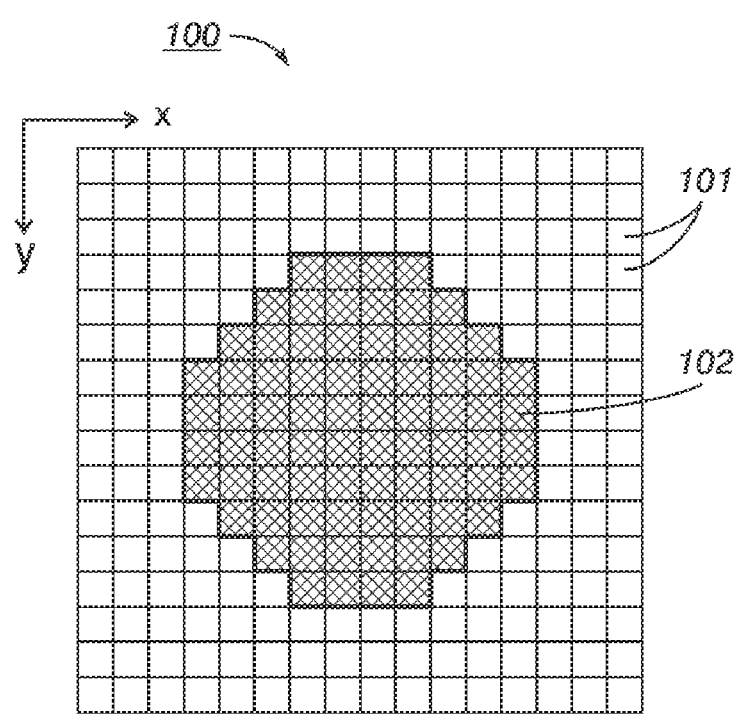
FIG. 1 illustrates one example single halftone cell or "periodic tile" (not to scale) whereon a halftone dot has been printed, each cell encompasses a plurality a pixel locations as defined by the device's halftone screen.

What is disclosed is a system and method for data embedding via halftone dot orientation modulation. Data is encoded in a cover contone image as a function of halftone dot orientation modulation. A method for decoding message data embedded in an image print via halftone dot orientation is also disclosed.

It should be understood that one of ordinary skill in this art should clearly understand many facets of halftone processes, halftone screens, halftoning, and other related techniques common in the color science arts. Additionally, one should also be readily familiar with mathematical techniques involving the computation of image moments, conditional densities, probabilistic modeling, and the like, as discussed herein. One of ordinary skill would also be knowledgeable about computer science and hardware and software systems and algorithms sufficient to implement the functionality and capabilities described herein in their own document reproduction environments without undue experimentation.

An "image" refers to a pattern of physical light comprised of known colors of the light spectrum which are visible by the human eye. An image input device receives the image. Image input devices include scanners, cameras, photography equipment, copiers, facsimile devices, photo reproduction equipment, and the like. To render an image is to output the image to an image output device. Image output devices receive the image signal and reduce the signal to viewable form. Example image output devices capable of image reduction include printers, copiers, monitors, projectors, and the like. Image reduction includes the process of marking a substrate with colorants to form the image from the visual integration of the colorants on the substrate, or to display the image on an image display device.

A scanner is an image input device that optically scans images, print media, and the like, and converts the scanned image into a digitized format. Common examples are variations of the flatbed scanner known in the arts wherein specialized image receptors move beneath a platen and scan the media placed on the platen. Modern scanners typically use a charge-coupled device (CCD) or a contact image sensor (CIS) as the image sensing receptor. A signal of the scanned media is produced by the scanning device. Such an image signal contains digitized information about pixels and their locations within the scanned print.

Halftoning is the process of representing a continuous tone (contone) image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications. Due to their stability and predictability, clustered dot halftoning is one of the primary choices for xerographic printing systems. Traditional clustered dot halftones were restricted to a single frequency because they were generated using periodic gratings that could not be readily varied spatially. Halftoning techniques are widely employed in the printing and display of digital images and are necessary because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Typically, pixels are converted to black if they are below the threshold and white otherwise. Digital halftones generated using threshold arrays that tile the image plane were originally designed to be periodic for simplicity and to minimize memory requirements. With the increase in computational power and memory, these constraints become less stringent.

As used herein, the term "unique state" refers to one of the states from a predefined set. For example, in a 2-state system (two orientation directions), the set of binary values is: $\{0, 1\}$. This set contains a total of $2^1=2$ possible unique states a single data value can take. In a 4-state system (4 orientation directions), the set of binary values is: $\{00, 01, 10, 11\}$. This set contains a total of $2^2=4$ possible unique states a single data value can take. Another set contains the binary values: $\{000, 001, 010, 011, 100, 101, 110, 111\}$. This set contains a total of $2^3=8$ unique states, and so on. Note, while sets of binary values are shown for ease of illustration, the unique states can in general be derived from any arbitrary set whose cardinality does not necessarily has to be a power of 2.

A "data message" or "original message", as used herein, refers to any information (text, numeric, etc.) which can be reduced to a binarized bit stream of 1's and 0's representative of a collection of unique states. An original message is composed of a plurality of single data values. Each of the single data values is associated with one of the possible unique states taken from one of the sets of binary values, as defined above, used for encoding. An original data message having a data format other than binary must be converted to a binary bit stream prior to embedding. Any of a plurality of techniques well known in the arts can effectuate data conversions. The unique state of each single data value retrieved from each periodic tile during decoding collectively forms the original message.

Single data values are encoded in the image by orienting halftone dots in a unique orientation direction. As will be discussed in further detail herein, each of the unique states from a given set of binary values used for encoding is associated with a unique orientation direction. If a 2-state system is used for encoding then a single data value can assume one unique state (0 or 1) from the defined set of binary values. In this case, two unique orientation directions are necessary in order to embed all possible single data values. For example, the unique state of 0 might be associated with an orientation direction along a major x-axis (horizontal 0°). The unique state of 1 would then be associated with an orientation direction orthogonal to the x-axis along the major y-axis (vertical 90°). In a 4-state system {00, 01, 10, 11}, a total of 4 unique orientation directions would be needed to embed all possible single data values. In this instance, the unique state of 00 might be associated with an orientation direction along the major x-axis; the unique state of 01 might be associated with the major y-axis; the unique state 10 might be associated with the diagonal axis (+/−45°); and the unique state 11 associated with yet another discernable orientation direction.

At the onset hereof, it is important to provide a brief explanatory illustration which will provide a basis for an understanding of the teachings hereof.

Reference is made to FIG. 1 which illustrates one halftone cell 100 whereon a halftone dot 102 has been printed. Each halftone cell encompasses a plurality a pixels. Each pixel 101 has its own respective location within a cell. Cell size for a given halftone screen is constant. It should be clear that a halftone cell may encompass more or fewer pixels than are being shown for explanatory purposes. Thus, the cell of FIG. 1 is clearly illustrative. Printed dot 102 is also illustrative. In practice, a dot would be printed at a resolution such that the jagged lines shown were not visible to the eye. Cell 100 represents a very small region of a larger region on a print media whereon all halftone dots are printed. The collection of printed halftone dots forms the viewable image. The resolution of the image output device is usually defined by the number of pixels. The dimensions of the halftone screen designed for a particular marking device defines the dimensions of the halftone cells (or tiles).

The fine resolution in which pixels are printed visually integrates neighboring pixels. The visual integration of pixels creates a specific gray level or color for the printed dot, for example, light gray, dark gray, sky blue, azure green, or one of millions of possible colors. The mixing of differing colors creates a specific color defined by the designers of the color marking device. Neighboring cells become visually integrates to collectively form, for example, a blue sky or a azure sea of an image. Not all pixel locations of all cells have colorant deposited thereon. For each tile, a matrix defines whether a pixel is turned ON or OFF. If the value of the mask at a location is "ON" then, in one instance, a colorant is deposited at that pixel location. If the value of the mask at a location is "OFF" then no colorant is deposited at that location. Information about what has been printed at each pixel location can be retrieved from a scan of the image using an image scanning device. The image sensors of the scanning device provide digitized information about at each pixel. Preferably, the image is scanned with a scanning device having at least the same resolution or a higher resolution (number of pixels) as the color marking device used to output the image print.

Figure 2A:
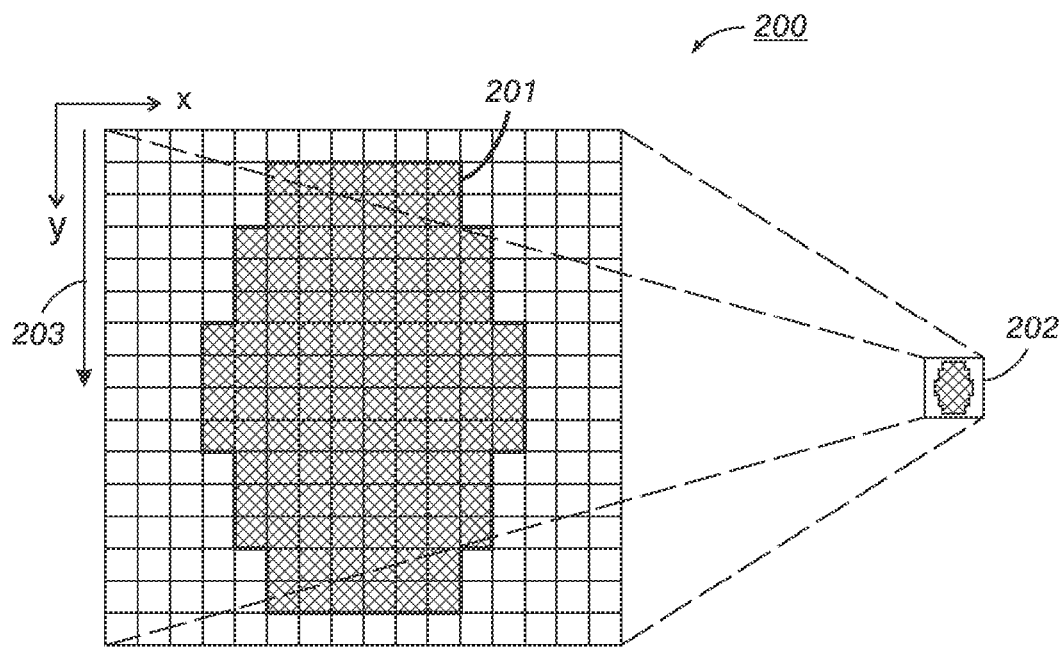
FIG. 2 illustrates example orientation directions in accordance with the teachings hereof.
Figure 2B:
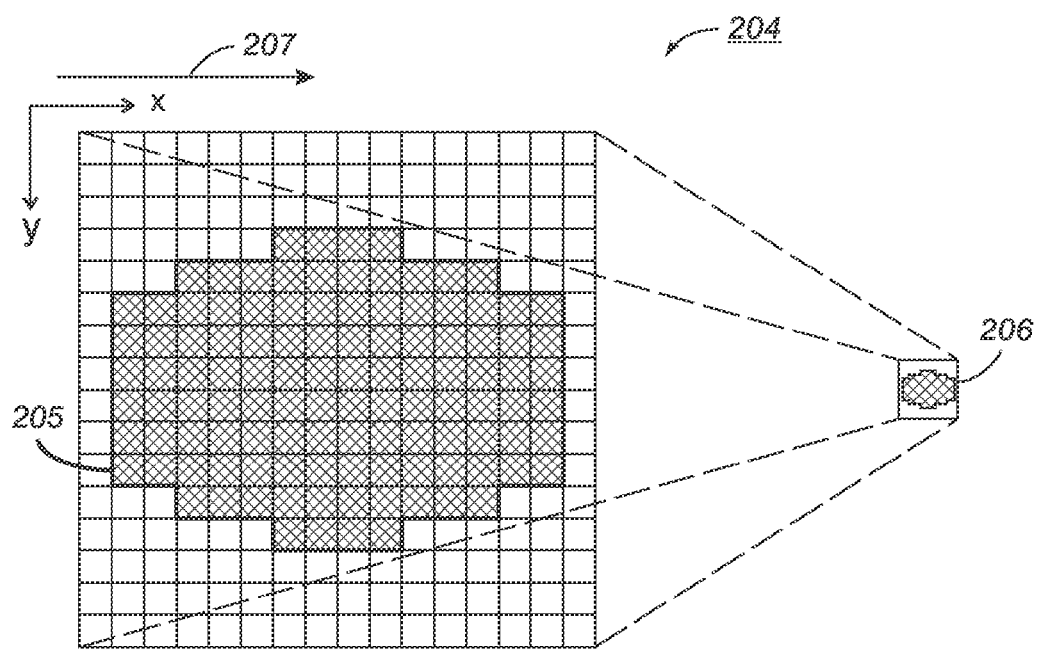

Reference is now made to FIGS. 2A-B which illustrate example orientation directions in accordance with the teachings hereof. The halftone dot of FIG. 1 is shown reprinted in cell 200 of FIG. 2A. Dot 201 is the much smaller dot 202 shown substantially enlarged to illustrate the approximately elliptical dot having been oriented in a direction substantially along the y-axis 203. The cell 204 of FIG. 2B shows dot 205 substantially enlarged from dot 206 to illustrate the approximately elliptical dot oriented in a direction substantially along the x-axis 207. The elliptical dot can be additionally be oriented substantially along a diagonal axis (+/−45°) (not shown). Another orientation could be represented by the dot being printed substantially circular and thus not oriented along either coordinate axis.

As previously discussed, each of the unique orientation directions of the halftone dots is associated with a unique state. In a 2-state system having {0, 1}, the state of 0 might be associated for instance with the dot orientation direction of FIG. 2A and the unique state of 1 might be associated with the dot orientation of FIG. 2B (or vice-versa). Each single data value of the message having a unique state of 1, for instance, is printed in its respective cell with an elliptical dot elongated in the direction of the x-axis. Single data values with a unique state of 0 are printed in their respective cells with an elliptical dot elongated in the direction of the y-axis. In decoding, dots determined to have an orientation predominantly along the y-axis would be decoded as having unique state 0. Likewise, dots determined to have an orientation predominantly along the x-axis would be decoded as having unique state 1.

In a 3-state system, having three unique orientation directions, a dot determined to have, for example, an orientation direction predominantly along the x-axis would be decoded as unique state 00. A dot determined to have an orientation direction predominantly along the y-axis would be decoded as unique state 01. A dot determined to have an orientation direction predominantly along a diagonal axis would be decoded as unique state 10 (or alternatively unique state 11 since only three orientation directions are being used). Hence, no $4^{th}$ orientation direction is needed. In this example, the single data values can only assume of three of the four possible unique states from the set: {00, 01, 10, 11}.

In the present method, data is embedded in a cover contone image as a function of dot orientation. Each of the unique states that a single data value can have is mapped to a respective dot orientation direction. Each unique state is associated with an array of threshold values designed to produce a particular dot orientation. Pixel intensity values of each periodic cell wherein a single data value is to be embedded are compared to the corresponding values of the associated threshold array. The result of all the comparisons for all pixel locations within a given tile produces an array of 1's and 0's (binary mask) for that tile. Binary values of a mask for a given tile define whether a given pixel within the tile is turned ON or OFF. Turning pixels ON/OFF enables the dot to be printed in an ellipsoid shape having the intended orientation e.g. horizontal (0°), vertical (90°), diagonal (+/−45°), etc. The dot orientation is associated with the unique state of the single data value embedded in that tile. The image is printed with the halftone dots oriented in the intended directions defined by the single data values embedded therein. Given the high resolutions of today's printing devices, slightly elongated ellipsoid dots oriented in one direction or another are too small to be seen by the unaided eye. Since most images contain many halftone tiles, a huge number of single data values of an original message can be encoded in an image. One implementation hereof demonstrates that up to $3\times10^5$ bits can be embedded and recovered from an 8"×8" image scan. The encoded message is retrieved following global and local synchronizations which address geometric distortions introduced by the printing system utilized for the image print and in the scanning process for capturing a digital image from the image print. Image moments are calculated for each halftone dot, in a manner as discussed herein further. A maximum-likelihood function uses density values of the image moments to determine orientation direction. The unique state associated with the determined dot orientation direction decodes the single data value encoded in that cell. The original message is reconstructed from the collection of decoded single data values.

Figure 3:
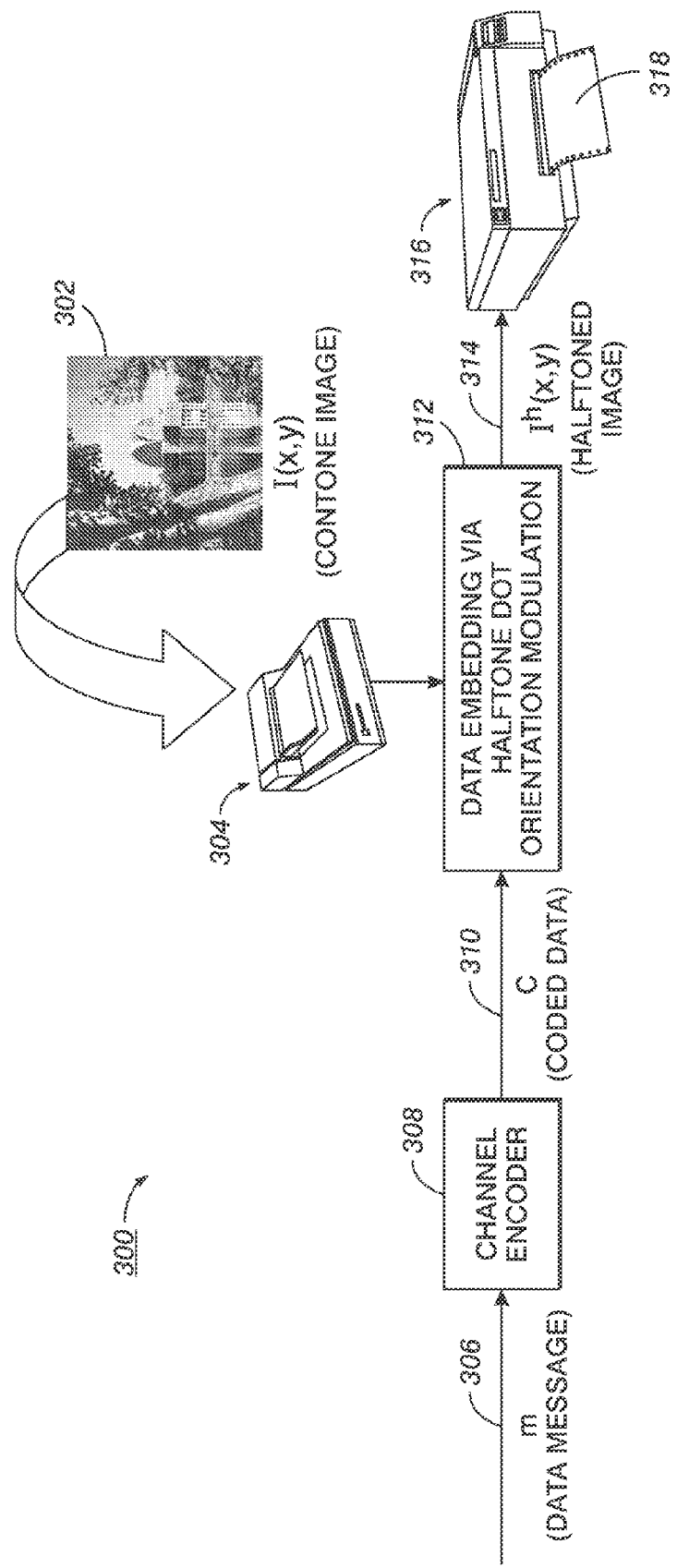
FIG. 3 broadly illustrates one example block diagram for embedding message data in a contone image via dot orientation modulation.

Reference is now made to FIG. 3 which broadly illustrates one example block diagram for embedding a data message in a contone image via dot orientation modulation.

A cover contone image 302, denoted I(x,y), is scanned into digitized form using scanning device 304. A plurality of contone data points is obtained. A data message 306 is received by a channel encoder 308 which introduces redundancy in the data to enable error recovery at the decoding end. The decoder produces a data stream of coded data 310. Using the cover contone image and the coded data bits, single data values are encoded via dot orientation modulation 312. The image is halftoned using halftone dots in the determined orientations required to embed the coded data. Data embedding and halftoning are preferably preformed concurrently where feasible. If data is encoded prior to halftoning, it operates on the contone image and the image may be distorted. If data embedding is performed after halftoning, it is necessary to ensure that the data embedding process retains image quality, which can be challenging since the image is already in a binarized representation. The resulting halftone image 314, denoted $I^h(x,y)$, is printed on marking device 316 and hardcopy 318 of the image containing the embedded original message is produced. It is understood that the cover contone image may be alternatively obtained from a different digital capture device such as a digital camera, slide digitizer, etc.

Figure 4:
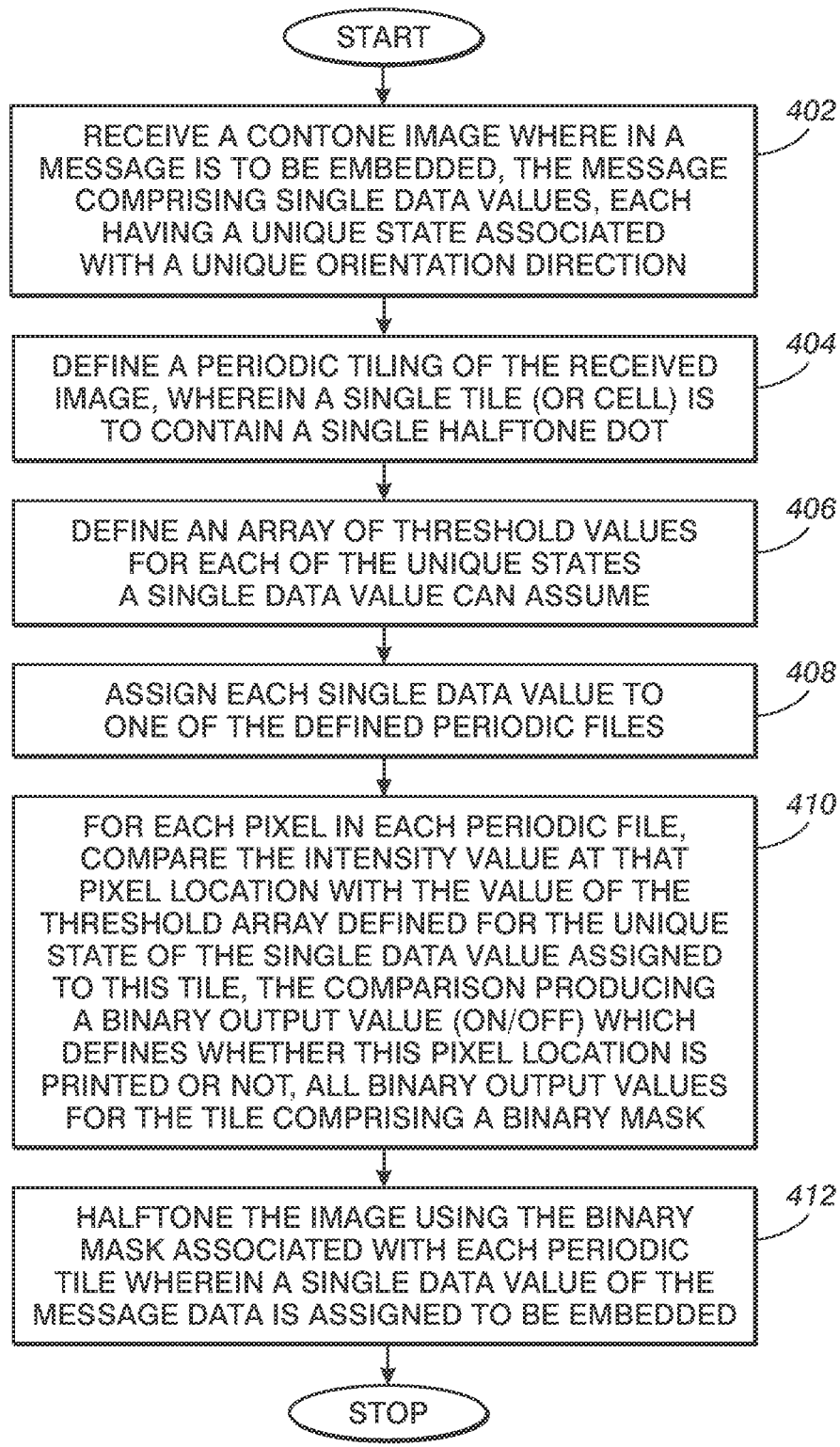
FIG. 4 illustrates a flow diagram of one example embodiment of the present method for data embedding via dot orientation modulation.

Reference is now made to FIG. 4 which illustrates a flow diagram of one example embodiment of the present method for data embedding via dot orientation modulation.

At 402, a cover contone image comprising a plurality of contone data points is received. The image is received through a scanning device. Individual pixels are represented in a digitized form. Each of the digitized values represents an intensity value at a given pixel location. An original message composed of a plurality of single data values is to be embedded in the received image. Each single data value can assume only one unique state from the set of binary values defined for the encoding process. The set of binary values is defined by the total number of unique orientation directions. Each of the orientation direction is associated with one of the possible unique states any single data value of the original message can take.

At 404, a periodic tiling is defined for the image. The uniform tiling is based on a spatial extent of the image as defined by the halftone screen. Each of the uniform periodic tiles encompasses an array of pixel intensity values. Each uniform tile is a single cell containing a single dot. No more than one dot is printed in any given cell.

At 406, for each unique state a single data value can assume, an array of threshold values is defined. Individual threshold values are defined for a given halftone screen frequency (number of pixels arrayed in a single cell) and a given dot shape (unique orientation direction). The number of threshold values corresponds to the number of intensity values arrayed in each tile. In other words, there exists a one-to-one correspondence of pixel intensity values in each cell to threshold values in each threshold array. In a two-state system wherein a single data value can assume one of two unique states (0 or 1), two threshold arrays are defined, one for each unique state. One threshold array $T_0(x,y)$ would be associated with the unique state of 0. Another threshold array $T_1(x,y)$ would be associated with the unique state of 1. Each threshold array is designed to produce a resulting dot with an elliptical shape elongated in the unique orientation direction associated with the single data value's unique state. The orientation direction is thus representative of the unique state of the single data value embedded in that tile.

At 408, each single data value is assigned to a specific tile in the image wherein it is to be encoded. Data can be encoded in tiles in a certain region of the image as it may be desirable to embed the original message only in a defined region within the image such as, for instance, an upper corner or in a center portion, or alternatively in an object in the image or in specific image content. In this instance, periodic tiles in regions wherein the original message is not embedded can either contain no single data values (dots not elongated in any direction), or can contain a predetermined sequence of bits such as all 1's or all 0's. Defined bit sequences may be added (or padded) to the original message such that every tile in the image has a single data value embedded therein. This may be done in instances where all tiles of the entire image are preferably processed at a single time instead of only certain tiles in defined image regions being processed separately. Bits or bit sequences used as padding can be readily identified during decoding and removed from the retrieved bit stream when the original message is reassembled.

At 410, for each pixel in each periodic tile, the intensity value at that pixel location is compared against its corresponding threshold value of the threshold array defined for the single data value to be encoded in the current tile. For instance, in a two-state system, if the single data value to be encoded in the current tile has a unique state of 0, the threshold array $T_0(x,y)$ is used for comparison purposes. Threshold array $T_0(x,y)$ is designed to elongate the elliptical dot in an orientation direction associated with the unique state of 0 (such as horizontal). If, on the other hand, the single data value to be encoded in the current tile has a unique state of 1, then the threshold array $T_1(x,y)$ is used for comparison purposes. Threshold array $T_1(x,y)$ is designed to elongate the elliptical dot in the orientation direction associated with the unique state of 1 (such as vertical).

At 412, the image is then halftoned using the binary masks. Printing a halftone dot according to the binary mask for a given cell elongates the halftone dot along the intended orientation direction according to the unique state of the single data value encoded in that tile. The image containing the embedded message can then be rendered to an output device. The message is secure because it can only be decoded from the image wherein it has been embedded through an understanding of the various unique states the single data values assumed and the orientation direction associated with each of the unique states.

The description which follows focuses on binary data using two orthogonal orientations, e.g., the x-axis in a first direction (horizontal), and the y-axis in a second direction (vertical). For notational simplicity, the following is based on a 0°/90° case wherein a unique state of 0 corresponds to an orientation direction along a major x-axis and a unique state of 1 corresponds to an orientation direction along a major y-axis.

Figure 5:
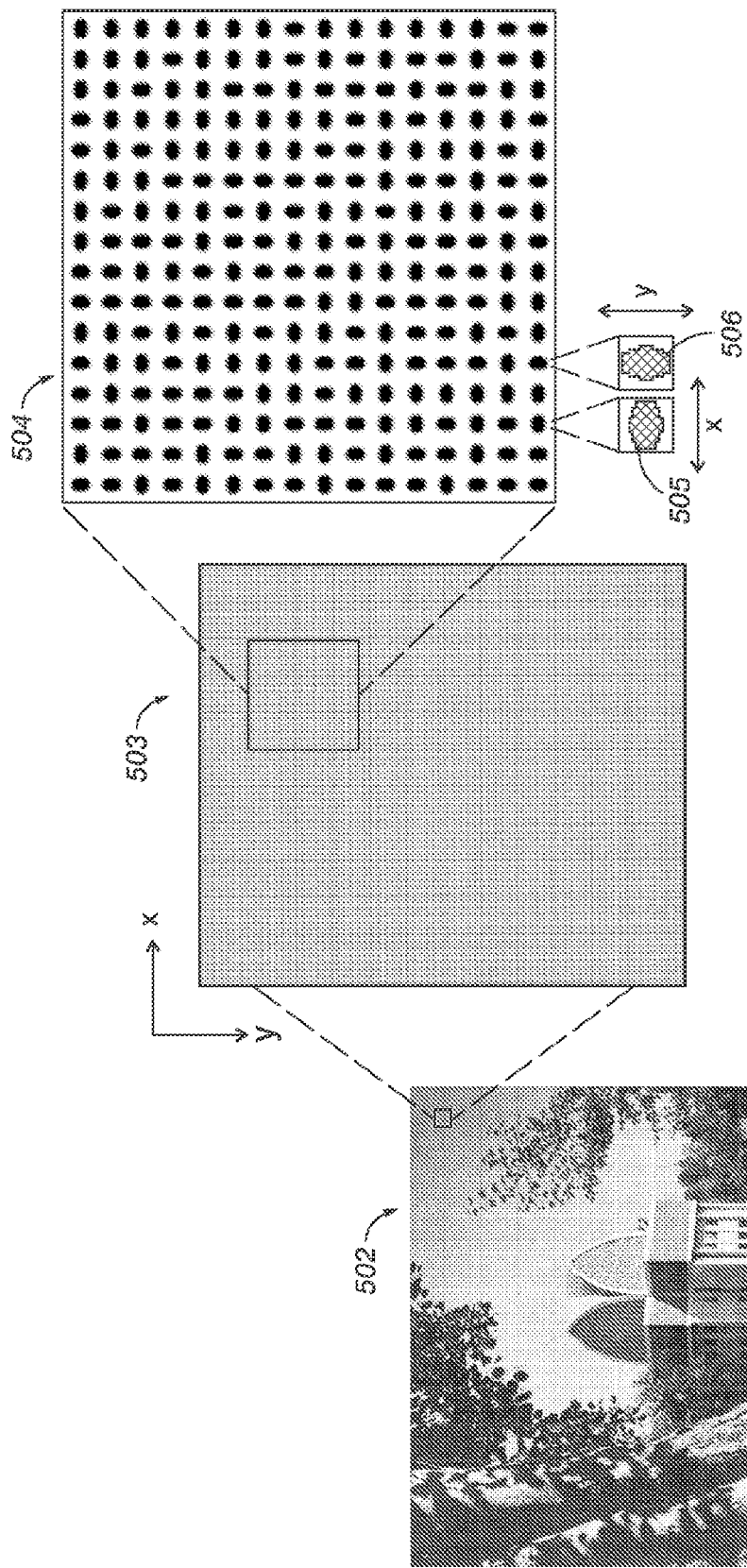
FIG. 5 illustrates an example gray level halftone image wherein message data has been encoded in accordance with the present method of data encoding via halftone dot orientation modulation.

Reference is now made to FIG. 5 illustrating an example gray level halftone image wherein message has been embedded in accordance with the present method of data encoding via halftone dot orientation modulation. Image subsection 503 represents a small section of image 502 having one major axis in the x-direction (horizontal) and the other major axis in the y-direction (vertical). This orientation represents the 0°/90° case. Image subsection 504 represents a section of image subsection 503. Image subsection 504 illustrates the individual halftone dots and their respective orientations. The respective orientation directions of each of the halftone dots of image subsection 504 correspond to the unique state of the single data value encoded in each respective halftone cell. Halftone dot 505 of image subsection 504 has an elliptical dot oriented substantially in a horizontal orientation along the x-axis. Halftone dot 506 has an elliptical dot oriented substantially in a vertical orientation along the y-axis. As previously discussed, the orientation of each of dot is based on the unique state of the single data value encoded in that cell.

Figure 6:
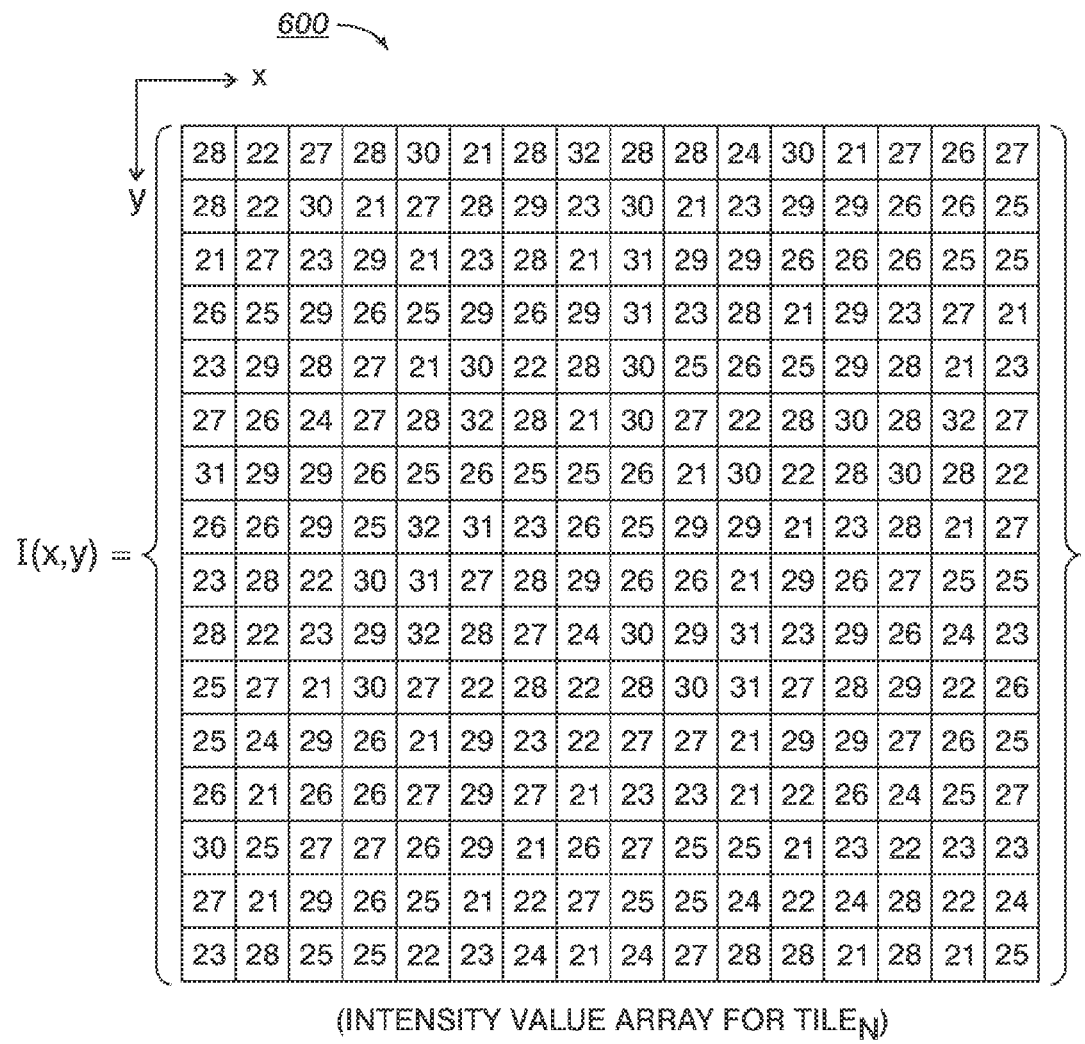
FIG. 6 illustrates an example array of pixel intensity values for the cell of FIG. 2A.

Reference is now made to FIG. 6 illustrating an example array 600 of pixel intensity values for the cell of FIG. 2A. Each intensity value in the array will be compared to a threshold value in the corresponding threshold array associated with the unique state of the single data value to be encoded in this cell. Per this example, the unique state of 1 corresponds to a dot orientation in a direction along the major y-axis (as shown in FIG. 2A). The respective threshold array for this cell is associated with the unique state of 1. The threshold array is designed to produce a binary mask which orients a halftone dot along the y-axis.

Figure 7:
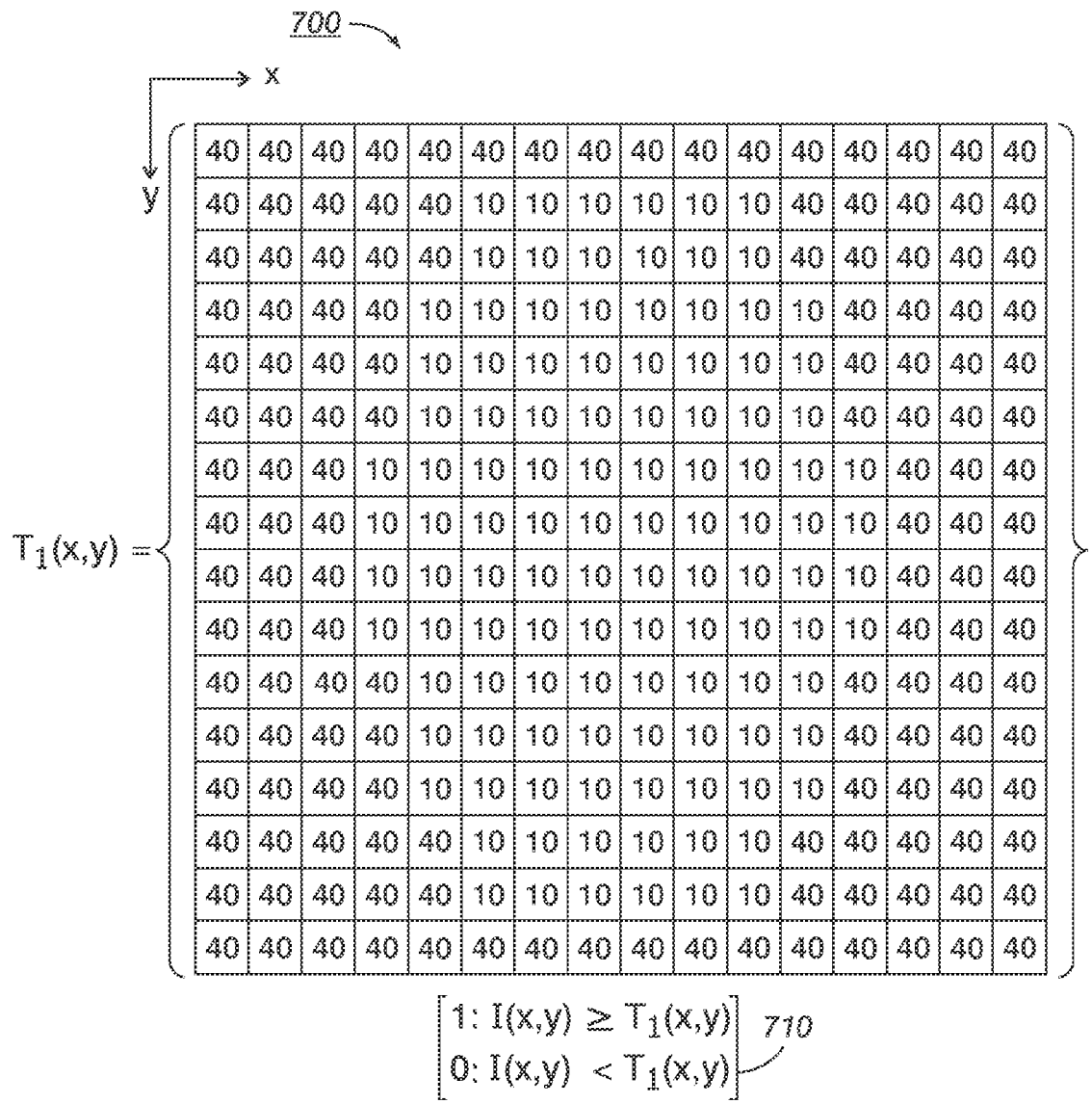
FIG. 7 illustrates an example threshold array $T_1(x,y)$ to be compared to the array of pixel intensity values of FIG. 6.

Attention is directed to FIG. 7 illustrating an example threshold array $T_1(x,y)$. The individual threshold values of the threshold array are compared to the pixel intensity values of FIG. 6. Threshold array 700 is associated with the unique state of 1. The single data value to be encoded in this particular tile has a unique state of 1. This threshold array is designed to orient a dot in a direction along the y-axis. In this example, halftone dots oriented along the y-axis encode a single data value having a unique state of 1. All halftone dots oriented along the x-axis encode a single data value having a unique state of 0 using threshold array $T_0(x,y)$ associated with this particular unique state. It is understood that the threshold array $T_1(x,y)$ in FIG. 7 is utilized for ease of illustration here where the values in the threshold array are either 0 or 40. Actual threshold arrays would have entries distributed over a larger set of possibilities in order to allow good representation of different gray levels in the output halftone image.

As previously discussed, depending on the unique state of the single data value to be encoded within any give periodic tile, a threshold array $T(x,y)$ is used for comparison purposes. Each threshold array is designed to produce a unique dot orientation.

One example threshold function used to modulate dot orientations along the x and y axis, is given by:

$$T(x,y) = \text{sgn}(\cos(2\pi f_x X)\cos(2\pi f_y Y))|\cos(2\pi f_x X)|^{\gamma_x}|\cos(2\pi f_y Y)|^{\gamma_y}$$

where $f_x$ and $f_y$ are parameters that control the dot shape in the x and y directions.

Programmable parameters, $\gamma_x$ and $\gamma_y$ are used for dot orientation. Setting one of these parameters to a larger value gives rise to elliptically shaped dots oriented along one of the vertical or horizontal directions. For instance, if $\gamma_x$ is greater than $\gamma_y$, the dot is oriented along a vertical axis. If $\gamma_y$ is greater $\gamma_x$ than then the dot is oriented along a horizontal axis. In the case where $\gamma_x$ equals $\gamma_x$, the dot is symmetric about the x and y axis. The function sgn ( ), which extracts the sign of a real number, is given by:

$$\text{sgn}(t) = \begin{cases} 1 & \text{if } t \geq 0 \\ 0 & \text{if } t = 0 \\ -1 & \text{if } t < 0 \end{cases}$$

Dots are oriented based on the following relationship:

$$I^0(x, y) = \begin{cases} 1 & \text{if } I(x, y) \geq T(x, y), \\ 0 & \text{if } I(x, y) < T(x, y), \end{cases}$$

Using the above relationship, if the intensity value at a given x,y pixel location within a tile is greater than or equal to the corresponding threshold value of the associated threshold array then a binary output value of 1 is produced (pixel is turned ON) for that pixel location. If the pixel intensity value is less than the corresponding threshold value then the binary output value is 0 (pixel is turned OFF) for that pixel. The collection of comparison results for a given tile produces a binary mask of 1's and 0's for that tile. Printing the dot according to the cell's binary mask produces a dot with the orientation direction associated with the unique state of the single data value encoded in that cell.

A comparison of each of the intensity values in the array of FIG. 6 with their respective threshold values in the threshold array of FIG. 7 proceeds according to the threshold function 710. A binary output value (0 or 1) is produced for each pixel location as a result of the comparison.

FIG. 8 illustrates an example binary mask for the cell of FIG. 2A resulting from the comparison of the intensity values of FIG. 6 with each of their respective corresponding threshold values in the threshold array of FIG. 7. In the example illustration, pixels are printed in each location where the binary mask has a value is 1 and pixels are not printed where the value is 0.

The present method for data embedding via halftone dot orientation modulation provides many advantages. In instances where it is desirable to embed multiple original messages in a single image, a first message can be encoded in one region of the image and a second message encoded in another region. In the remaining regions not containing the original data message, identifiable bit sequences can be used as "filler". Such bit sequences may be, for example, a repeating sequence of "100100100" or "100010001", such that bit sequences decoded from regions of the image wherein real message data is not embedded can be readily identified during decoding and removed. Alternatively, a "tag" can be added to the beginning and end of each message to identify, during decoding, when the message starts and when the message ends. Data segments decoded not having the appropriate tag would be ignored.

Optionally, a tag can be embedded in a specific location within the image such as, for instance, the lower left corner or upper right, to identify the specific bit sequence "filler" or "padding" used in the encoding process. Extraneous bits can be readily separated from the real message. The tag could be retrieved at the start of the decoding process from a location in the image where such a tag is known to be embedded, and used to facilitate the removal of identifiable bits or bit sequences from the decoded data bit stream. Removing padding or filler bits from the data message can be done during decoding but may alternatively be preformed in a post-processing step wherein the image may be further manipulated, converted, error corrected, translated, and the like.

Since the image itself has an x, y axis, it can be thought of as a matrix of periodic tiles. Embedded tags can alternatively be utilized to identify a starting tile in the matrix of periodic tiles within the image wherein the message is to be found. For example, a tag decoded from the lower left corner of the image might define a tile location (150, 875) indicating a starting tile wherein a first single data value of the original message can be found. A second tag retrieved from, for example, the upper right corner might be used to define a second location where a second message can be found. A second tag might also define a tile location where the embedded message ends. Tags, filler, and bits used as filler can each be embedded in the image using the teachings hereof. Many additional embodiments, features, and enhancements are envisioned and are intended to fall within the scope of the appended claims.

Tags can additionally be embedded in the image using the present dot orientation method which provide the decoder process with a list of the unique states the embedded single data values can take and provide information about which unique dot orientation directions are associated with each of the unique states. Other information about the size of the periodic tiles can also be embedded. In this embodiment, the decoder would not need to know any prior information about the tiling, orientation directions, and associated unique states used to embed the data message in the image. The decoder would only have to know about the tags and their locations.

In addition to the many features and advantages previously mentioned, the halftone encoding process can be performed offline for each clustered dot design to be supported by a particular printer. For example, the conversion can be performed by a software-based embodiment implemented in a computer system or a control unit in communication with the image path of a xerographic or other document production device. Further, the present method for data embedding via halftone dot orientation is well matched to the characteristics of halftone printing and causes only a minimal increase in the distortion pre-existing in halftones. This is because the halftone reproduction process relies on matching the average gray-level of the print to the desired image and the change in dot orientations induced by dot orientation modulation embedding does not change the average gray level within each halftone cell.

For typical printing resolutions, halftone dot orientation-based embedding causes minimal degradation in output image quality. When the two orthogonal orientations used for the embedding are symmetrically located with respect to the two orthogonal directions that define printer addressability, the symmetry in the printing system ensures that the tone response for halftones of the two orientations is near identical. Thus, embedding does not change the average gray level, which is one fundamental image fidelity criterion in halftone reproduction. This happens for instance when the embedding utilizes a +/−45° orientation in a printing system with the natural 0°/90° axis.

What is also disclosed herein is a method for decoding data from a scanned image print containing the original message embedded via the above described dot orientation method.

Figure 9:
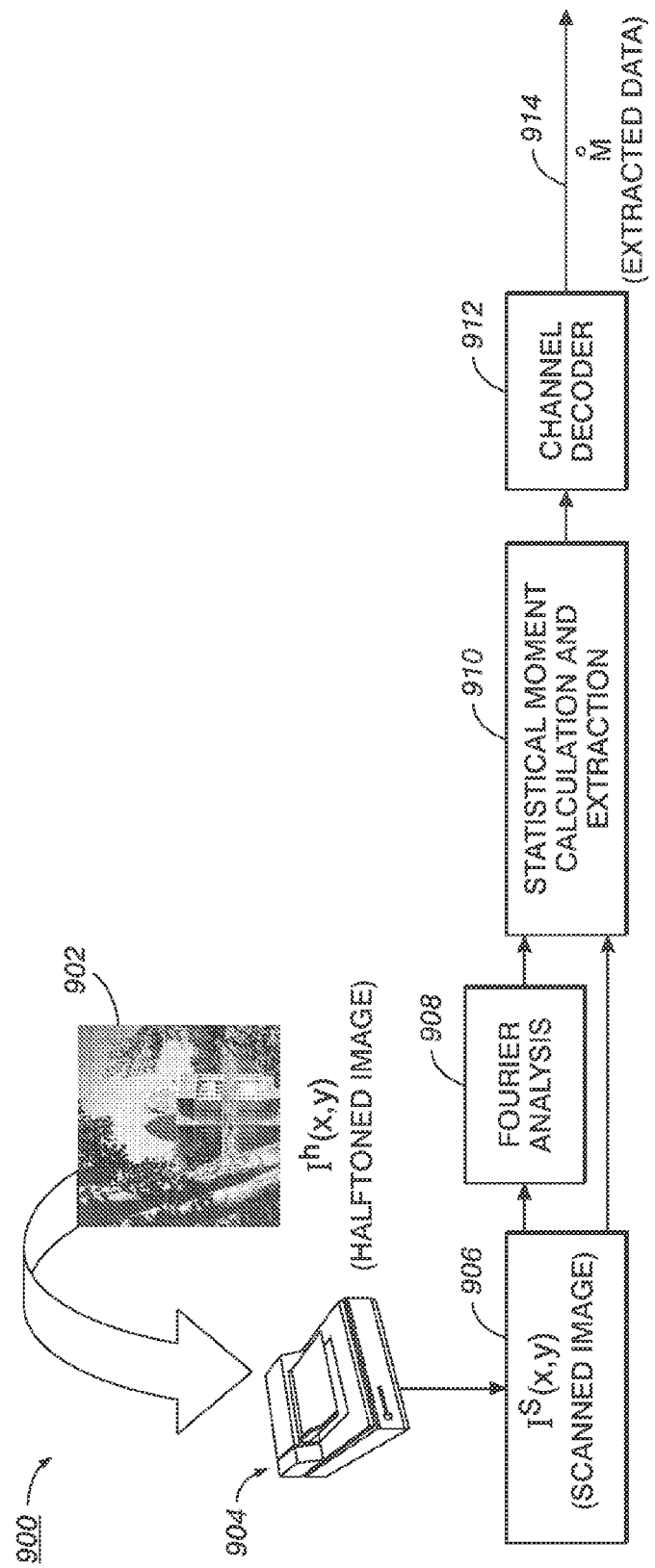
FIG. 9 broadly illustrates one example block diagram for decoding data from a scanned image which was embedded using the present halftone dot orientation method.

Reference is now made to FIG. 9 which broadly illustrates one example block diagram for decoding data from a scanned image which was embedded using the present halftone dot orientation method. The halftoned image 902 containing the oriented elliptical halftone dots in accordance with the present method is scanned using scanning device 904. The scanning of the print produces scanned image 906, denoted $I^s(x,y)$. The scanned image comprises a plurality of color data points. The color data is then locally and globally synchronized. For screened halftones (both clustered and dispersed-dot), the inherent periodicity of the screening process provides a natural template for global synchronization. Peaks in the Fourier Transform 908 of the scanned image are used to estimate global rotation and scaling factors. At 910, moment extraction and local image gray level estimation is performed. The extracted moments and gray level estimations are provided to a channel decoder 912. Since the original message is embedded in oriented halftone dots, statistical criteria that capture dot orientation are used by the channel decoder for data extraction. The extracted message 914 is retrieved.

Figure 10:
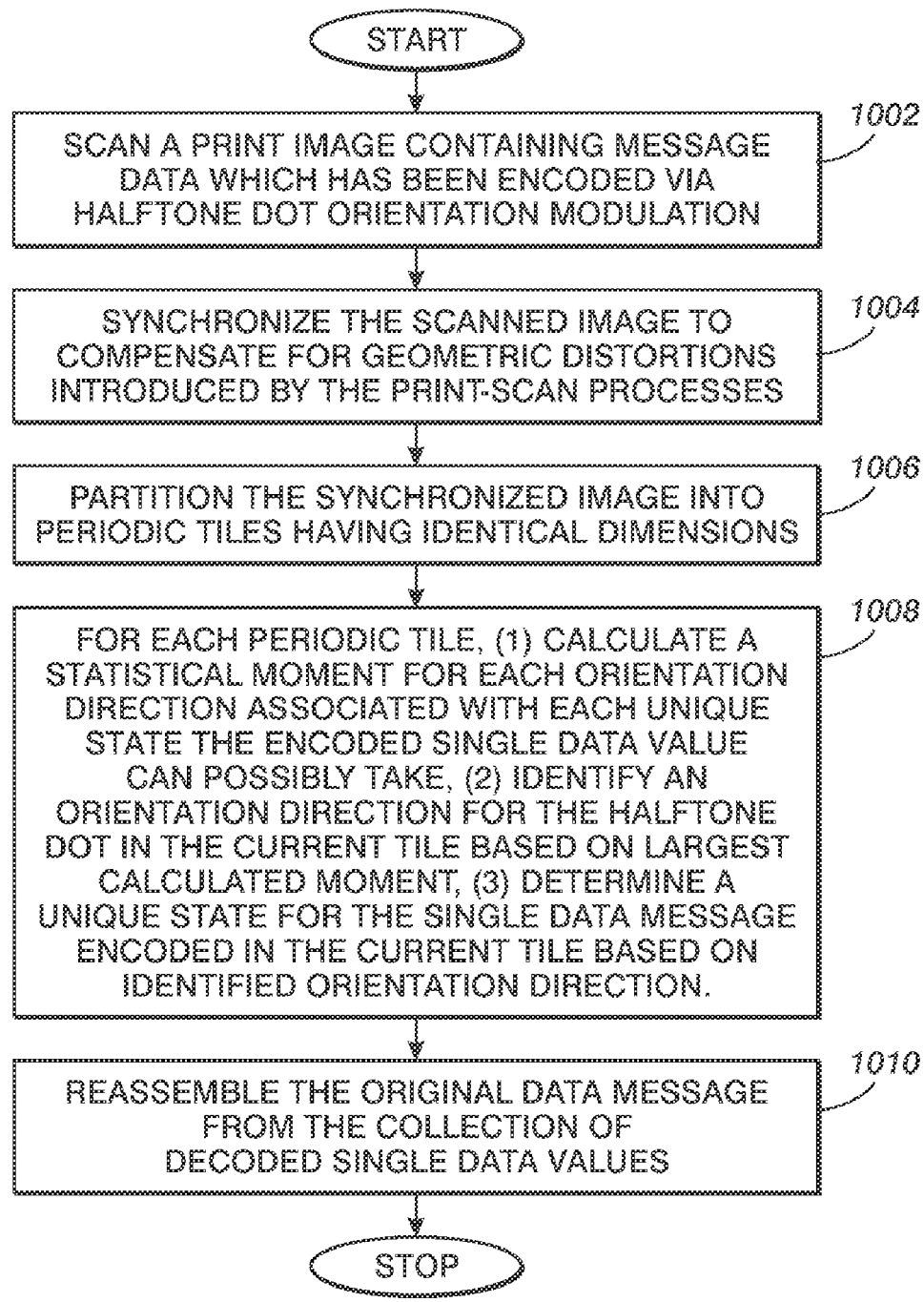
FIG. 10 illustrates a flow diagram of one example embodiment of the present method for decoding data which has been encoded via halftone dot orientation.

Reference is now made to the flow diagram of FIG. 10 which illustrates one example embodiment of the present method for decoding data which has been embedded via halftone dot orientation.

At 1002, a printed image containing an encoded message is scanned. The message encoded in the image comprises a plurality of single data values. Each single data value assumes only one unique state from the set of binary values used for encoding. Each of the unique states is associated with a unique orientation direction. At 1004, the scanned image is synchronized to compensate for geometric distortions introduced into the image by the print/scan process. In one embodiment, the image is synchronized based on estimated global rotation and scaling factors computing from a probabilistic model of the scan channel of the scanning device used to scan the print image. At 1006, the scanned image is partitioned into a periodic tiling. Each of the uniform periodic tiles encompasses a single halftone dot. The uniform tiling has the same periodicity as that used when the original message was embedded in the image. At 1008, for each of the periodic tiles in the scanned image, a plurality of image moments are calculated for the halftone dot of the current tile. One image moment is calculated along each of the unique orientation directions. Image moments are based on a computed center of mass for the halftone dot. An orientation direction for the halftone dot in the current tile is determined based upon the largest calculated image moment. All pixels in a particular halftone cell contribute to moments along their respective orientation direction. The larger distance to the center of mass (along the respective axis) is interpreted to mean that the dot is elongated along that axis and thus oriented in that direction. The identified orientation direction is associated with one of the unique states a single data value can take. The single data value embedded in the current tile is decoded based on the unique state associated with the determined orientation direction. The collection off decoded single data values forms the original message. At 1010, the message embedded in the printed image is reassembled from the decoded single data values.

In an alternative embodiment, the original message is encoded in one or more specific regions of the contone image. In this case, regions of tiles containing embedded single data values would have to be first identified. As previously discussed with respect to the data encoding method, one or more "tags" are placed within the image at predetermined tile locations. The tags identify regions in the image where the original message is located. Such tags in predetermined regions of the image would first be decoded. The decoded tags would indicate one or more regions within the image where the original message is located. Those unique tiles wherein the original message is embedded would be decoded. The single data values decoded from these identified tiles would form the original message. Other variations are intended to fall within the scope of the appended claims.

Embodiments for calculating image moments ($\sigma_x, \sigma_y$) for unique orientation directions based on a computed center of mass for a given dot will next be discussed.

Dot orientation estimation is based on statistically motivated image moments computed within each halftone cell. In one embodiment, the image moment along the x-axis is determined by:

$$\sigma_x = \frac{1}{S} \sum_{x,y \in C} I^s(x,y)(x-\bar{x})^2$$

where $$S = \sum_{x,y \in C} I^s(x,y) \text{ and } \bar{x} = \frac{1}{S} \sum_{x,y \in C} I^s(x,y)x$$

represents the abscissa of the center of mass of the halftone dot and the range of the summations C denotes the spatial extent of the halftone cell corresponding to the halftone dot. The moment $\sigma_y$ along the y-axis is calculated in a similar fashion. The moment vector, given by ($\sigma_x, \sigma_y$), is interpreted as a lower-dimensional (2D) feature vector that identifies orientation.

Thus:

$$\sigma_x = \frac{\sum_{x,y \in C} I^s(x,y)(x-\bar{x})^2}{\sum_{x,y \in C} I^s(x,y)}$$

$$\sigma_y = \frac{\sum_{x,y \in C} I^s(x,y)(y-\bar{y})^2}{\sum_{x,y \in C} I^s(x,y)}$$

where:

$$\bar{x} = \frac{\sum_{x,y \in C} I^s(x,y)x}{\sum_{x,y \in C} I^s(x,y)} \text{ and } \bar{y} = \frac{\sum_{x,y \in C} I^s(x,y)y}{\sum_{x,y \in C} I^s(x,y)}$$

represents the center of mass of the halftone dot, and $\sigma_x$, $\sigma_y$ indicate image moments calculated along orthogonal x and y axis, respectively. It is understood that the above equations represent the desired image moments for the case where less than half of the halftone tile is covered by toner or ink in the marking process. In the application of the method for regions where more than half of the halftone tile is covered by toner or ink, the scanned image data is inverted prior to the computation of the moments. It will also be readily apparent to those skilled in the art that if more than two orientations are utilized for the embedding, moments corresponding to those orientations can be readily computed through a simple rotation of the coordinate axes to the desired orientation prior to computing the moments.

Decoding using the calculated image moments along each respective orientation direction involves determining a larger of the calculated moments. One such rule for the case of two embedding orientations is given by the relationship:

$$\sigma_x \gtreqless_0^1 \sigma_y.$$

If the calculated moment in the x direction is larger than the y-direction, for example, then the dot is determined to be oriented predominantly along the x-axis and the resulting associated unique state is 1. If, on the other hand, the calculated moment is larger in the y-direction then the dot is oriented predominantly in the y-direction and the resulting associated unique state is 0. The single data value embedded in this tile would be decoded by the unique state determined by the unique state associated with the orientation direction determined by the direction of the largest calculated moment.

The moments along the orthogonal (x,y) axis can be seen as being approximately conditionally independent given the embedding orientation and the average gray level.

For channel coding, two code families, i.e., convolutional codes and repeat accumulate (RA) codes are considered. One skilled in this art would be familiar with both code families. See: "*Coding theorems for 'turbo-like' codes*", D. Divsalar, H. Jin, R. J. McEliece, Proc. Allerton Conference, 201-210, Monticello, Ill., USA, (September 1998), which is incorporated herein in its entirety by reference. See also: "*Irregular Repeat-Accumulate Codes*", H. Jin, A. Khandekar, R. McEliece, Proc. 2nd Int'l. Conference on Turbo Codes, Brest, France, (September 2000), which is incorporated herein in its entirety by reference. The choice of convolutional codes is motivated by the fact that good codes with low to moderate complexity are known for a variety of rates and the merit of the probabilistic channel model can be clearly demonstrated for these codes by contrasting soft and hard decoding. The choice of RA codes was motivated by the fact that these are near capacity-achieving and also readily allow the rate to be varied through a change of the repetition parameter. Maximum likelihood decoding of convolutional codes can be achieved by, for instance, utilizing a Viterbi algorithm which allows for both hard and soft decoding. Approximate maximum a posteriori probability (MAP) decoding for RA codes is accomplished using belief propagation for iterative decoding.

For both convolutional and RA codes, decoding used a log likelihood ratio:

$$\gamma = \log \frac{p(\Theta_1, \hat{g})}{p(\Theta_2, \hat{g})}$$

where $p(\Theta_i, \hat{g})$ is the likelihood given by:

$$p(\Theta_i, \hat{g}) = f_{xy}(\sigma_x | \Theta_i, \hat{g}) \cdot f_{xy}(\sigma_y | \Theta_i, \hat{g})$$

where $\sigma_x$, $\sigma_y$ are the image moments along the x and y directions computed within the halftone cell and $\hat{g}$ is the estimate of the local gray-level obtained as the average of the pixel intensity values within the halftone cell.

For the convolutional codes, the use of the image adaptive decoding with the channel characterization yields much lower bit error rates than the hard decoding alternative which does not utilize this characterization. For the RA codes, the benefit of utilizing embedding schemes and decoding methods that are specifically designed for the print-scan channel in consideration—(operational) error-free embedding rates achieved are much greater than those reported by existing hardcopy data hiding methods.

In order to incorporate channel dependence on the local gray level of the cover image, a statistical model for the channel needs to be expressed in the form of a conditional density function, $f(\sigma_x, \sigma_y/\Theta_i, g)$. The received image moments are conditioned on the local image gray level $g$ and, horizontal and vertical orientations given by: $\Theta_{i,i}=1,2$.

A probabilistic model can be constructed which conditions received moments on input orientations by assuming conditional independence for the multi-dimensional density functions. One such a model is given by:

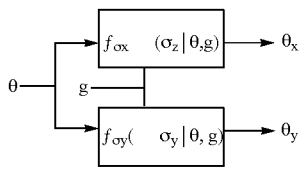

where the following conditional independence is assumed:

$$f_{\sigma_x,\sigma_y}(\sigma_x,\sigma_y|\Theta_g) = f_{\sigma_x}(\sigma_x|\Theta_g) \cdot f_{\sigma_y}(\sigma_y|\Theta_g).$$

The above assumption can be validated by observing 2×2 covariance matrices of the received random vector a conditioned on $\Theta_1, \Theta_2$, for several gray levels. Empirical estimates of these covariance matrices obtained from scanned images corresponding to prints for different gray levels are provided. It should be appreciated that most of the matrices are close to diagonal thereby indicating that they may approximately be modeled as independent (because zero covariance across the off-diagonals guarantees "uncorrelatedness" and not independence). One example covariance matrix is as follows:

$$C_1 = \begin{bmatrix} 0.36 & 0.08 \\ 0.08 & 0.17 \end{bmatrix}$$

$$C_2 = \begin{bmatrix} 0.54 & 0.02 \\ 0.02 & 0.26 \end{bmatrix}$$

$$C_3 = \begin{bmatrix} 0.56 & 0.07 \\ 0.07 & 0.29 \end{bmatrix}$$

$$C_4 = \begin{bmatrix} 0.80 & 0.07 \\ 0.07 & 0.53 \end{bmatrix}$$

$$C_5 = \begin{bmatrix} 1.02 & -0.20 \\ -0.20 & 1.21 \end{bmatrix}$$

$$C_6 = \begin{bmatrix} 0.20 & 0.07 \\ 0.07 & 0.40 \end{bmatrix}$$

$$C_7 = \begin{bmatrix} 0.22 & 0.07 \\ 0.07 & 0.40 \end{bmatrix}$$

$$C_8 = \begin{bmatrix} 0.26 & 0.01 \\ 0.01 & 0.56 \end{bmatrix}$$

$$C_9 = \begin{bmatrix} 0.39 & 0.06 \\ 0.06 & 0.70 \end{bmatrix}$$

$$C_{10} = \begin{bmatrix} 0.50 & -0.09 \\ -0.09 & 0.82 \end{bmatrix}$$

Figure 11A:
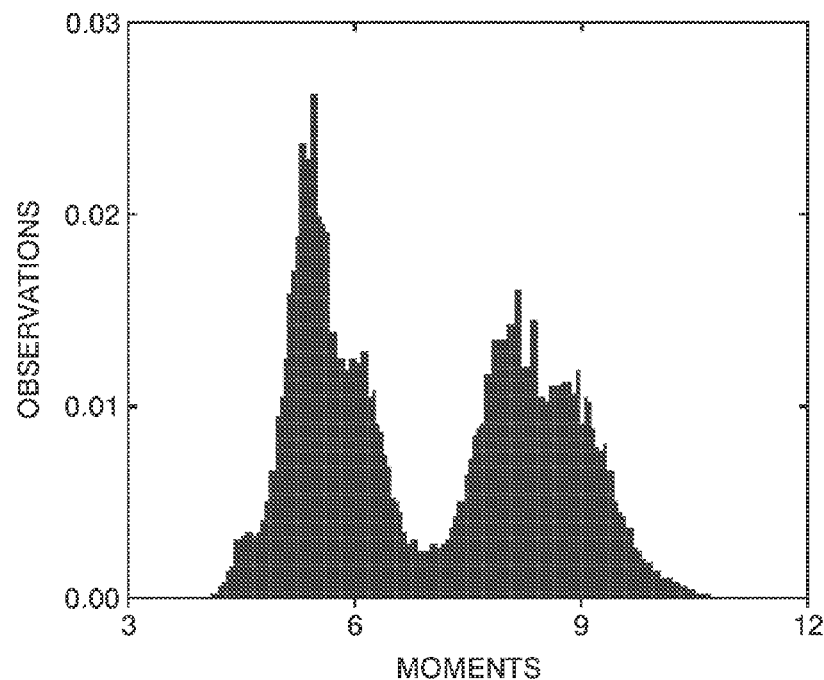
FIG. 11A shows histograms of the received moments, $\sigma_x$, $\sigma_y$, for the (transmitted) horizontal orientation $\ominus_1$ given two orientations at a gray level of 32%.
Figure 11B:
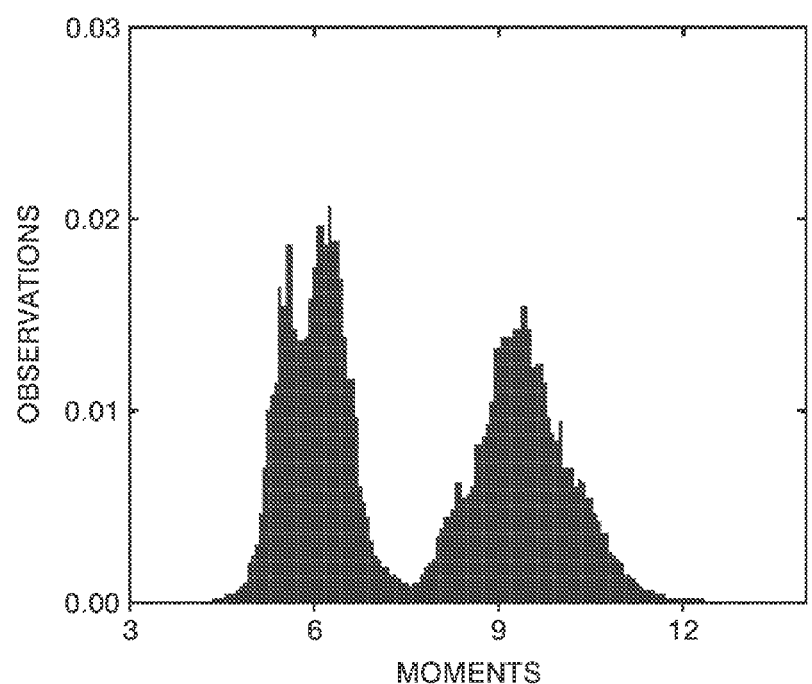
FIG. 11B shows the histograms of the received moments, $\sigma_x$, $\sigma_y$, for the vertical orientation $\ominus_2$ given two orientations at a gray level of 32%.
Figure 11C:
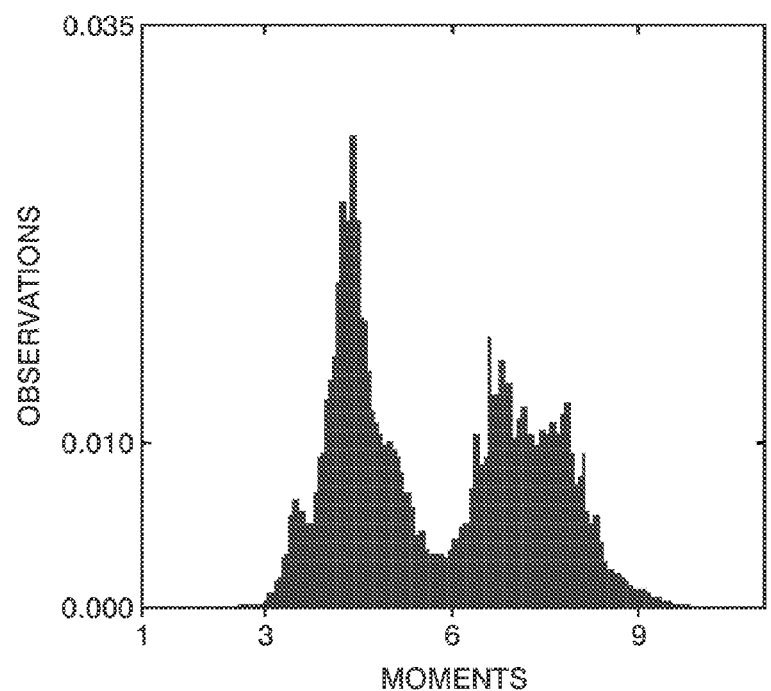
FIGS. 11C-D repeat the histograms of FIGS. 11A and 11B for a gray level of 52%.
Figure 11D:
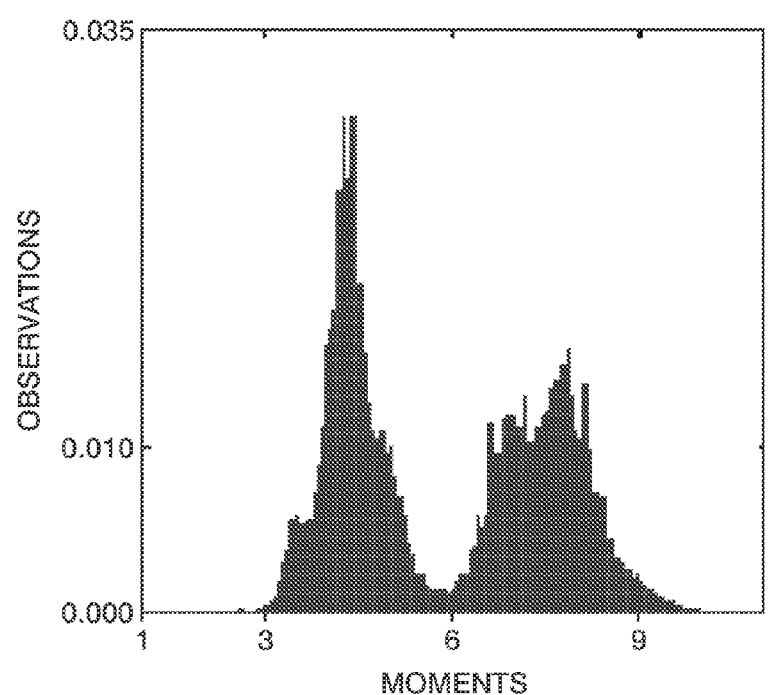

Conditional densities can be characterized in terms of experimentally determined empirical histograms. FIG. 11 shows the normalized histograms of the received moments $\sigma_x, \sigma_y$. FIG. 11A shows histograms of the received moments $\sigma_x, \sigma_y$ for the (transmitted) horizontal orientation $\Theta_1$ given two orientations at a gray level of 32%. FIG. 11B shows the histograms of $\sigma_x, \sigma_y$ for the vertical orientation $\Theta_2$ given two orientations at a gray level of 32%. FIGS. 11C-D repeat the histograms of FIGS. 11A-B for a gray level of 52%. The conditional densities were modeled by the exponential power density family parameterized by the scale parameter a and shape parameter b. One embodiment of an exponential power density is given by:

$$f_X(x) = \frac{1}{2a\Gamma\left(1 + \frac{1}{b}\right)} e^{\left(-\left|\frac{x}{a}\right|^b\right)}$$

For $b=1$, this reduces to a Laplacian distribution. For $b=2$, this takes a Gaussian form. The parameters of the distribution are estimated using the Expectation-Maximization algorithm for exponential families. See: "*The expectation-maximization algorithm*", T. K. Moon, IEEE Signal Processing Magazine, Vol. 13, No. 6, 47-60, (1996), which is incorporated herein in its entirety by reference.

A decision on dot orientation can then be made using a maximum-likelihood criterion. One example criterion is given by:

$$\Theta^s = \underset{i=1,2}{\operatorname{argmax}} f_{\sigma_x}(\sigma_x | \Theta_i) \cdot f_{\sigma_y}(\sigma_y | \Theta_i)$$

Orientation parameters were set such that: $\gamma_x=1$ and $\gamma_y=2$, in order to achieve a horizontally oriented dot. The parameters are swapped to orient the dot in a vertical direction. The halftone images were generated with a screen frequency of 75 cells per inch (cpi) along both vertical and horizontal directions. If each halftone cell is used for embedding, this amounts to 360,000 bits embedded in the image.

TABLE 1 enumerates various bit error rate (BER) performances for different gray levels with hard decoding and Maximum-Likelihood (ML) decoding. The term "NS" is used to indicate that symbol synchronization is not achieved for the corresponding gray level.

TABLE 1

| | Gray Level (percent) | | | | | | | |
|---|---|---|---|---|---|---|---|---|
| | 10 | 20 | 30 | 40 | 50 | 60 | 70 | 80 |
| Hard Decoding BER | NS | 0.0109 | 0.0032 | 0.0238 | NS | 0.0045 | 0.0303 | NS |
| ML Decoding BER | NS | 0.0085 | 0.0012 | 0.0073 | NS | 0.0043 | 0.0339 | NS |

As is evident from TABLE 1, data embedded in gray level areas ranging from 20% to 40% and from 60% to 70% can be recovered with a small BER. Note that 0% gray level corresponds to digital level 255 and 100% gray level corresponds to digital level 0. In highlights, shadows and mid-tone gray levels, however detection was not possible because symbol synchronization is completely lost in those regions.

Figure 12:
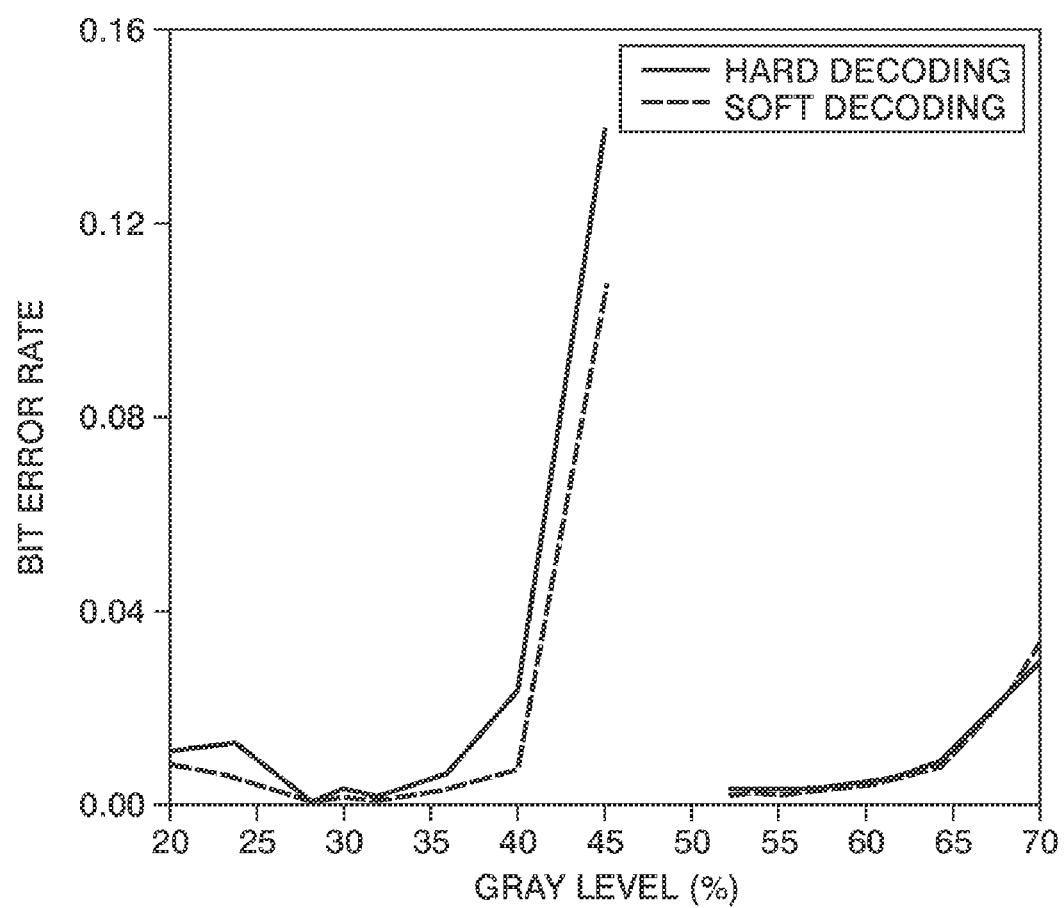
FIG. 12 plots bit error rate (BER) performance across gray levels.

Reference is now made to FIG. 12 which plots BER performance (as in TABLE 1) but across a larger number of gray levels. The plot shows that the lowest BER is achieved for gray levels around 30% and 60%. This is intuitively clear as highlights, shadows, and mid-tones (approx. 50%) do not provide sufficiently robust dot configurations. Thus, good performance can be expected between white and mid-tones, and black and mid-tones. A counter-intuitive observation is that at the 70% gray level, soft or Maximum-Likelihood (ML) decoding performs marginally less good than does hard decoding. This can be attributed to deviations of the assumed channel model from the true one and the inability to synchronize for gray levels in the 70% range.

Figure 13:
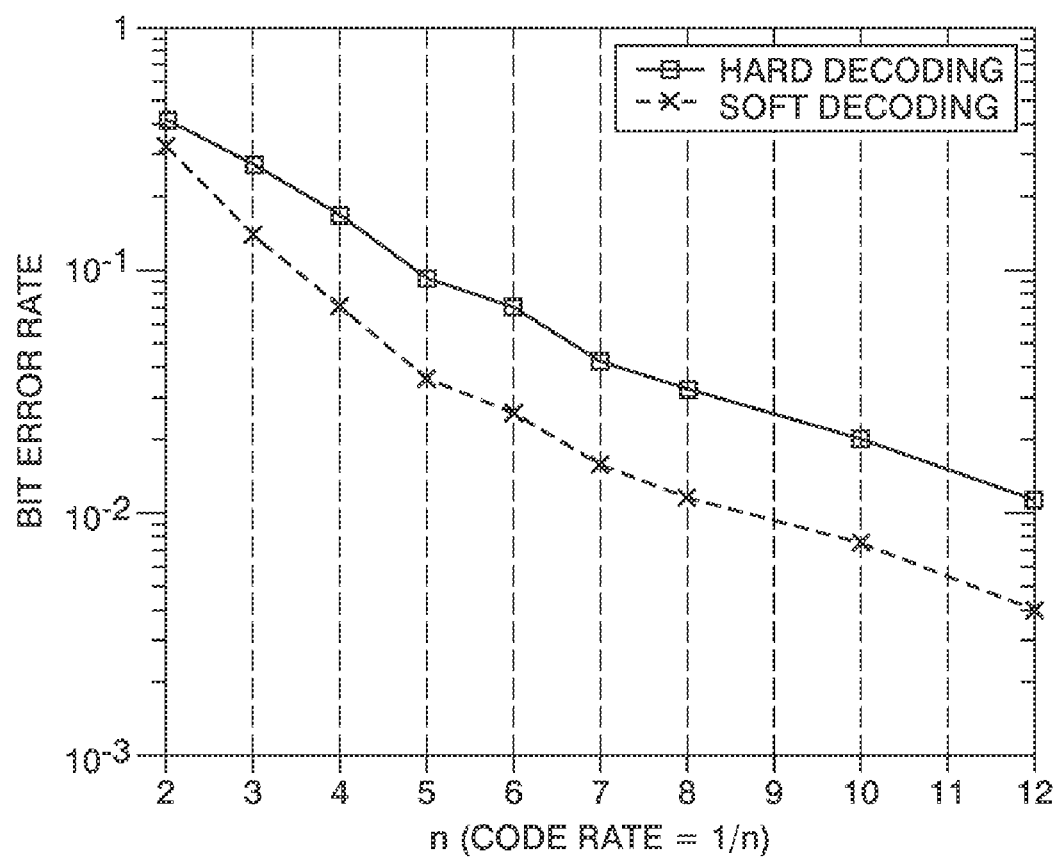
FIG. 13 plots bit error rate (BER) performance as a function of the code rate.

Reference is now made to FIG. 13 which illustrates decoding results in the form of bit error rate (BER) as a function of code rate. As shown, the cover dependent channel model reduces bit errors. This benefit is particularly pronounced at low code rates. As with convolutional codes, several different halftone images were generated with embedded data generated using RA coding on message bits. From scans of these printed images, it was determined that a code rate of ¼ allows for error free decoding. Hence, this rate provides a lower bound on data hiding capacity, i.e., 0.25 bits per halftone cell. This rate exceeds existing data embedding methods and approaches the capacity of hardcopy data encoding methods known in this art.

Figure 14A:
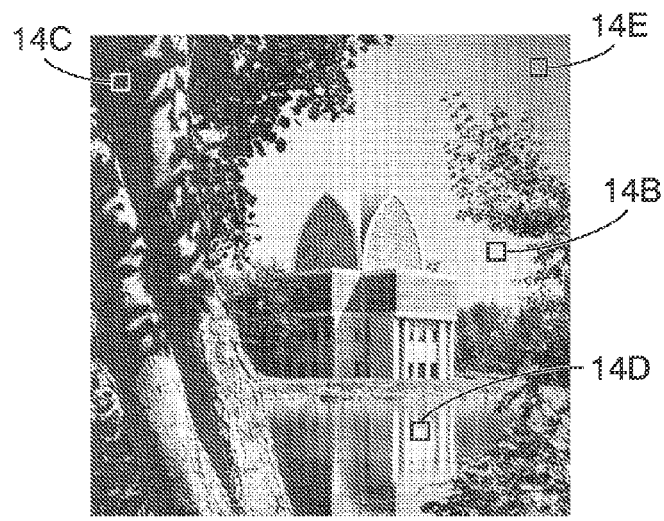
FIGS. 14A-E illustrate the effects of data embedding on a sample cover image.
Figure 14B:
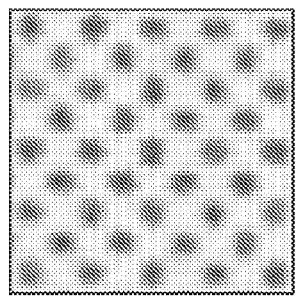
Figure 14C:
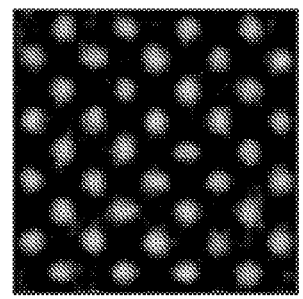
Figure 14D:
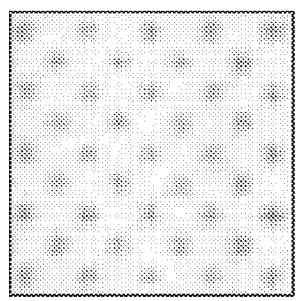
Figure 14E:
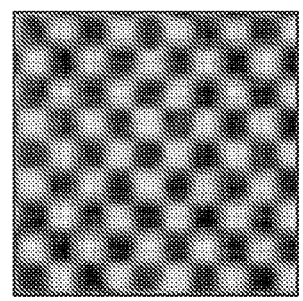

Reference is now made to FIG. 14 which illustrates the effects of the present data embedding method on a sample cover image, shown at FIG. 14A. FIGS. 14B-E show enlarged local views from a scan of a print of the image generated using the above described dot orientation method. The regions of the cover image, to which the associated local views correspond, are indicated by the corresponding labels. Elliptically shaped dots are utilized with a vertical/horizontal orientation along a major axis depending on the binary output value for each pixel in each tile. Black elliptical dots along the two orientations are produced on a predominantly white background in highlight areas, i.e. regions of the cover image with less than 50% halftone area coverage (FIG. 14B). White elliptical "holes" with the two possible orientations are produced in shadow areas, i.e. regions of the image with more than 50% halftone area coverage (FIG. 14C). While the embedding distortion characteristics are good, due to the inherent constraints of halftone reproduction, the robustness of the present dot orientation method demonstrates significant spatial variability depending on the local content of the contone image. In regions where the image is white, there is no printing and hence the computed image moments have no discernible dependence on the embedded single data value. This limitation also arises in regions where the cover image is close to white (FIG. 14D). In regions where the cover image is black, the halftone cells in the print are completely black. Consequently, the moments at the receiver convey no useful information about the embedded bit in regions where the cover image is black or near black. In mid-gray regions of the cover image that correspond to 50% halftone area coverage, and in regions where the area coverage is close to 50%, the printed halftones have the configuration of a checker-board pattern and orientation modulation is ineffective (FIG. 14E).

The present method was evaluated utilizing a print-scan channel consisting of a xerographic printer and a desktop scanner. The cover image dependence of the channel was characterized and decoding performance evaluated over test prints. A randomly generated bit stream was used as the original message to avoid any prescience. The data was encoded utilizing the encoder for the error correction code in consideration of either convolutional or RA codes. The resulting coded data and a target cover image served as the input to a module which jointly performed the halftoning and the data embedding operations. A 45° orthogonal halftone screen with a frequency of 75 cells per inch was utilized. The orientation of the screen should not be confused with the orientation of the halftone dots used for embedding. The resulting halftone image (with data embedded in the orientation) was printed on a color marking device which had an addressability of 2400 dpi. The resulting print containing the embedded data message was in turn scanned using a desktop scanner with a resolution of 1200 dpi. Global synchronization was performed on the scanned image utilizing the defined periodic grid of the halftone cells. Geometric distortion in the printing process was accounted for via decision directed local synchronization. Post-synchronization, the estimate $\hat{g}$ of the average gray-level in the halftone cell was obtained. Image moments $\sigma_x$ and $\sigma_y$ along the x and y axis, respectively, were computed in the manner discussed above.

The print-scan channel was characterized utilizing a set of training images from which the parameters for the statistical channel model were obtained via the Expectation-Maximization algorithm. System performance was then evaluated utilizing an independent test image. The printed size of the image was 8"×8". A total of 414,960 coded bits were embedded in the printed image. When using convolutional codes, the coded bits and corresponding halftone images with data embedding were generated for several different code rates $1/n$, where $n=\{2, 3, 4, 5, 6, 7, 8, 10, 12\}$. Convolutional codes used are known codes with low constraint length.

Results are further discussed in: "*Data Embedding in Hardcopy Images Via Halftone-Dot Orientation Modulation*", O. Bulan, V. Monga, G. Sharma, and B. Oztan, Proc. SPIE: Security, Forensics, Steganography, and Watermarking of Multimedia Contents X Electronic Imaging Symp., San Jose, Calif., USA (Jan. 27-31, 2008), which is incorporated herein in its entirety by reference. For a discussion regarding capacity for orientation modulation channels for data embedding in printed halftones, see: "*On the Capacity of Orientation Modulation Halftone Channels*", O. Bulan, V. Monga, and G. Sharma, Proc. IEEE Intl. Conf. Acoustics Speech and Sig. Proc., pp. 1685-1688, Las Vegas, Nev., USA (March 30-Apr. 4, 2008), which is incorporated herein in its entirety by reference. This paper discusses capacity upper bounds for orientation modulation channels and reveals that the channel capacity shows considerable variation as a function of gray level. This result helps in identifying hiding friendly gray levels.

Figure 15:
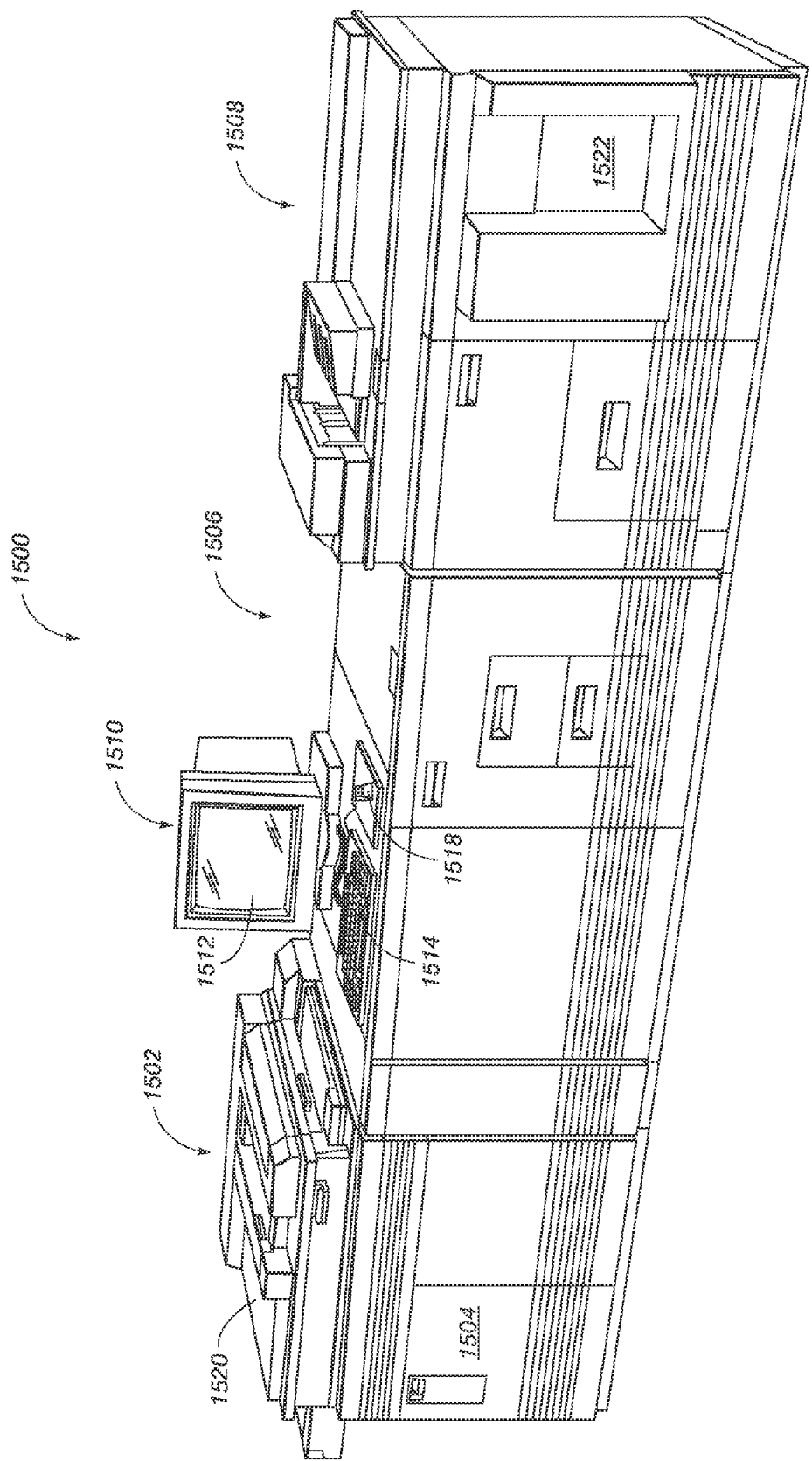
FIG. 15 illustrates one example document reproduction system wherein various aspects of the present method are likely to find their intended uses.

Reference is now made to FIG. 15 which illustrates one example document reproduction system wherein various aspects of the present method are likely to find their intended uses. Such an example document reproduction system has a scanner capable of scanning the cover contone image to obtain pixel intensity values. Arrays of threshold values are stored in memory or retrieved from a storage device. A special purpose computer or software loaded thereon would perform the calculations described herein to determine the orientation directions of each of the halftone dots of each periodic cell wherein a single data value of the original message is intended to be embedded in the halftone image. Such a system would be capable of rendering an output image containing the embedded data message. Such an example document reproduction would also be capable of receiving an image containing a data message embedded via halftone dot orientation through a document scanning device or from a storage device or from a network. The scanning device incorporated with such a document reproduction system would have sufficient resolution to scan the individual pixels necessary to obtain the data required for the calculations described above to determine the orientation of the halftone dots of each of the periodic cells wherein a single data value has been encoded. The system would determined the unique state of each of the encoded single data values based on the determined halftone dot orientations and retrieve the original message embedded in the scanned image print. The present method could also readily find its uses in a workstation environment similarly configured.

The example document reproduction system 1500 includes an input module 1502 having a controller 1504, a document processing module 1506, and a printer module 1508. The document processing module includes a document processing station 1510 that includes a display 1512, a keyboard 1514, and a mouse 1518. A scanning device 1520 is used to scan the image pixels of a color image. The document processing station may be used by an operator to set parameters or scan operations and other document processing and document printing operations. The instructions for these various operations may be input via the keyboard and/or mouse, or touch screen objects displayed on the display. The document processing station also includes a processor having memory and secondary storage, such as a disk drive, for storage of programs and data required for processing documents through system 1100. The printer module 1108 also includes processors and controllers for regulating the application of inks or toners onto paper as well as the control of papers moving through the printer module for proper registration in multi-channel color printing, and the like. The system includes one or more discharge areas 1122 where finished documents are deposited for retrieval. The special purpose controller 1104 (internal to system 1100) monitors and regulates the operation of the scanning device 1120 for obtaining the image pixel data points of the color image containing the original message embedded by the method described above. The controller includes a processor capable of executing machine program instructions for carrying out various aspects of the present method via any of a micro-processor, micro-controller, ASIC, electronic circuit, or special purpose computer as described herein further. Portions of the flow diagrams of the present method may also be implemented partially or fully in hardware in conjunction with machine executable instructions in communication with the controller. The controller also includes a network connection (not shown) for receiving color data points over a network such as an intranet or internet. The controller may also be in digital communication with one or more electronic media readers for the input of image data from electronic storage media such as, for example, a CD-ROM, or magnetic disk.

One or more aspects of the present method can be implemented on a special purpose computer. Such a special purpose computer can be integrated, in whole or in part, with, for example, a xerographic system or a color management or image processing software or computing system, which includes a processor capable of executing machine readable program instructions for carrying out one or more aspects of the present method. Such a processor is in communication with a bus (e.g., a backplane interface bus, cross-over bar, or data network). The system includes a main memory capable of storing machine readable instructions to be executed and may include random access memory (RAM) to support reprogramming and flexible data storage. The main memory may further include one or more buffers to store data. Memory may further be used to store executable machine program instructions that implement the methods described herein. The computer system may also include a secondary memory. The secondary memory may include, for example, a hard disk drive and/or a removable storage drive which reads/writes to a removable storage device such as a floppy disk, magnetic tape, optical disk, etc., used to store computer software and other machine readable instructions, and/or data. The secondary memory may also include other mechanisms for allowing computer programs or other instructions to be loaded into the computer system for execution. Such mechanisms may include, for example, removable storage adapted to exchange data through an interface. Examples of such mechanisms may further include a program cartridge and cartridge interface such as that found in video game devices, a removable memory chip such as an EPROM, or PROM, and associated socket, and other removable storage units and interfaces which allow software and/or data to be transferred to the computer system.

The computer system may additionally include a communications interface which acts as both an input and an output to allow software and data to be transferred between the computer system and external devices. Examples of a communications interface include a modem, a network interface such as an Ethernet card, a communications port, a PCMCIA slot and card, etc. Software and data transferred via the communications interface are in the form of signals and data which may be, for example, electronic, electromagnetic, optical, or other signals capable of being transmitted and received via a communications path (i.e., channel) configured to carry such signals and may be include wire, cable, fiber optic, phone line, cellular link, RF, or other communications channels. The computer system may additionally include a display interface that forwards data from a communication bus (or from a frame buffer) to a display device. The computer system may further include a scanning device capable of receiving color images and transforming the images into an electronic format. Such a scanning device would be capable of determining the color, location, and other information regarding the image pixels contained in the scanned color image.

Figure 16:
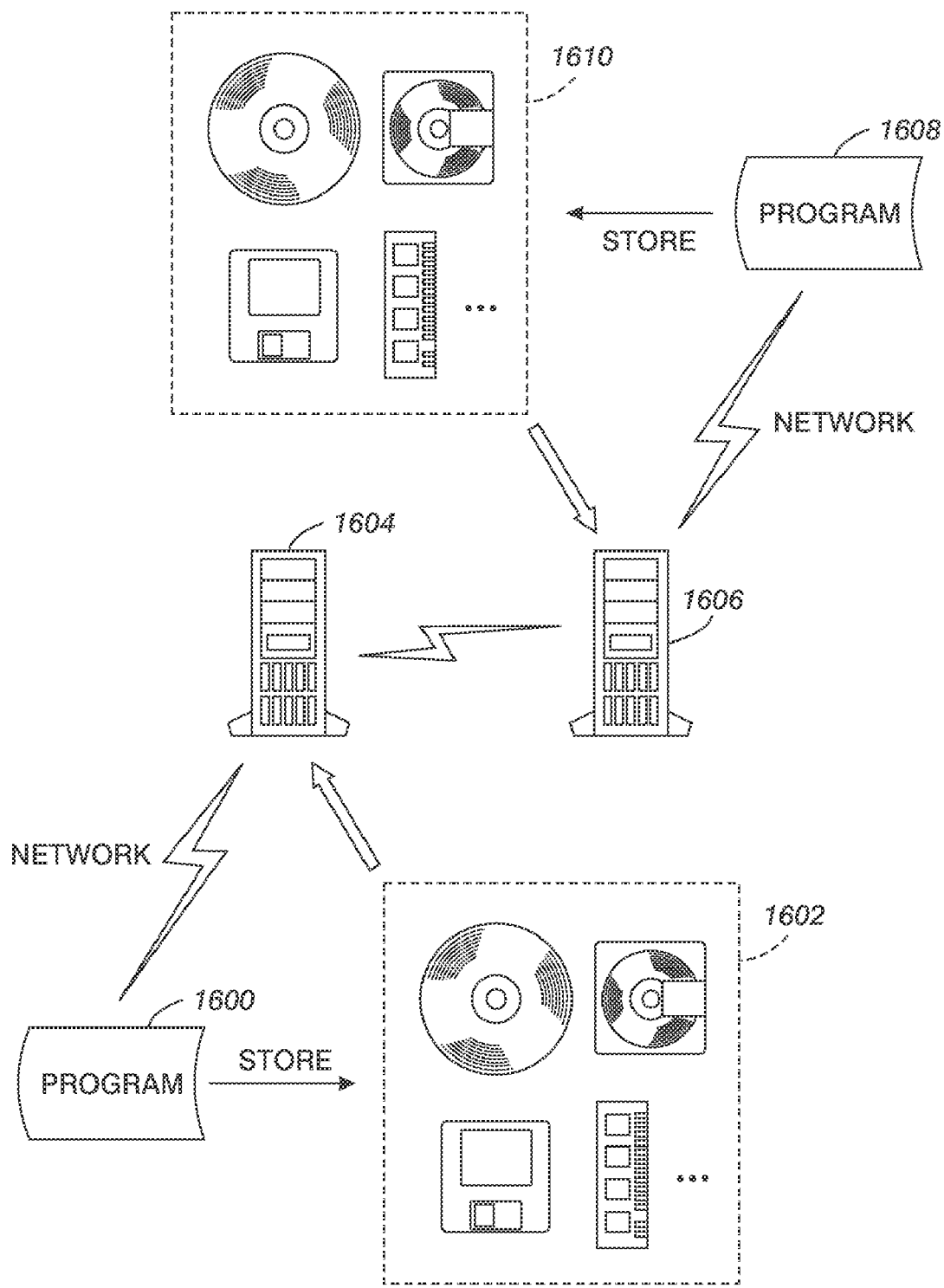
FIG. 16 is an explanatory diagram illustrating one example of a computer readable storage medium capable of storing machine readable instructions which, when mounted on a computer system, cause the computer system to perform one or more aspects of the present method.

Reference is now made to FIG. 16 which is an explanatory diagram illustrating one example of a computer readable storage medium capable of storing machine readable instructions which, when mounted on a computer system, cause the computer system to perform one or more aspects of the present method as described herein above. The machine readable instructions may be modified by one computer system and transferred to another computer system. One or more computer program instructions 1600 for carrying out the present method are loaded on computer-readable storage media 1602 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 1604 and transferred or otherwise communicated to computer system 1606. The program instructions can then be off-loaded to another program 1608, in original form or modified, including data, and stored on storage media 1610. Both of the computer systems include processors capable of executing machine readable program instructions.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method. The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for decoding data embedded in an image via halftone dot orientation, the method comprising:
    scanning an image print containing a data message embedded therein, said message comprising a plurality of single data values, each single data value taking only one unique state;
    synchronizing said scanned image to a uniform periodic tiling utilized for generating said image print to compensate for geometric distortions introduced by print/scan processes performed on said image print;
    associating a unique orientation direction with each of said unique states, each of said unique orientation directions being oriented with respect to a horizontal and vertical axis of said scanned image print;
    defining a uniform periodic tiling for said scanned image; and
    for each of said uniform periodic tiles in said uniform tiling,
        calculating a plurality of image moments for a halftone dot of a current tile, one image moment being calculated along each of said unique orientation directions;
        determining a largest of said calculated moments, said largest moment identifying a dominant orientation direction for said halftone dot; and
        decoding a single data value embedded in said current tile based on which of said unique states is associated said determined dominant orientation direction.

2. The method of claim 1, wherein synchronizing said scanned image comprises:
    obtaining a frequency domain representation of image data obtained from said scanned image print;
    locating positions of magnitude peaks in said scanned data;
    estimating a global rotation and a scaling factor from said magnitude peak positions; and
    synchronizing said scanned image based on said estimated global rotation and scaling factor.

3. The method of claim 1, wherein synchronizing said scanned image further comprises estimating an extent of each uniform tile in the scan coordinate space based on scan data of neighboring uniform tiles, said neighbor tiles preceding said current tile in the processing sequence.

4. The method of claim 1, wherein calculating two of said image moments ($\sigma_x$, $\sigma_y$) for unique orientation directions along orthogonal x and y axis comprises:

$$\sigma_x = \frac{\sum_{x,y \in C} I^s(x,y)(x-\bar{x})^2}{\sum_{x,y \in C} I^s(x,y)}$$

$$\sigma_y = \frac{\sum_{x,y \in C} I^s(x,y)(y-\bar{y})^2}{\sum_{x,y \in C} I^s(x,y)}$$

where:

$$\bar{x} = \frac{\sum_{x,y \in C} I^s(x,y)x}{\sum_{x,y \in C} I^s(x,y)} \text{ and } \bar{y} = \frac{\sum_{x,y \in C} I^s(x,y)y}{\sum_{x,y \in C} I^s(x,y)}$$

represents a center of mass of said halftone dot along each axis respectively and C denotes a spatial extent of the halftone tile.

5. The method in claim 4, wherein synchronizing said scanned image further comprises:
    for each tile in said uniform periodic tiling,
        estimating a center of said tile based on a center of mass determined for a halftone dot in said current tile; and
        using center of mass coordinates for said current tile and center of mass coordinates of spatially adjacent neighboring tiles surrounding said current tile to estimate a region in scan coordinates corresponding to a next tile to be processed.

6. The method of claim 4, further comprising calculating image moments along additional orientations obtained through a rotation of the x-y coordinate axis.

7. The method in claim 1, further comprising computing a plurality of image moments over a plurality of tiles in an error correction decoder to estimate the message embedded in said image print.

8. The method of claim 1, further comprising retrieving a tag from a predetermined location in said scanned image, said tag indicating a starting tile location in said image wherein said message data can be retrieved.

9. The method of claim 1, further comprising performing an error correction on said decoded message.

10. A system for decoding data embedded in an image via halftone dot orientation, the system comprising:
   a storage medium capable of storing data; and
   a processor in communication with said storage medium, said processor capable of executing a machine readable instruction for performing the method of:
      scanning an image print containing a data message embedded therein, said message comprising a plurality of single data values, each single data value taking only one unique state;
      synchronizing said scanned image to a uniform periodic tiling utilized for generating said image print to compensate for geometric distortions introduced by print/scan processes performed on said image print;
      associating a unique orientation direction with each of said unique states, each of said unique orientation directions being oriented with respect to a horizontal and vertical axis of said scanned image print;
      defining a uniform periodic tiling for said scanned image; and
      for each of said uniform periodic tiles in said uniform tiling,
         calculating a plurality of image moments for a halftone dot of a current tile, one image moment being calculated along each of said unique orientation directions;
         determining a largest of said calculated moments, said largest moment identifying a dominant orientation direction for said halftone dot; and
         decoding a single data value embedded in said current tile based on which of said unique states is associated said determined dominant orientation direction.

11. The system of claim 10, wherein synchronizing said scanned image comprises:
   obtaining a frequency domain representation of image data obtained from said scanned image print;
   locating positions of magnitude peaks in said scanned data;
   estimating a global rotation and a scaling factor from said magnitude peak positions; and
   synchronizing said scanned image based on said estimated global rotation and scaling factor.

12. The system of claim 10, wherein calculating two of said image moments $(\sigma_x, \sigma_y)$ for unique orientation directions along orthogonal x and y axis comprises:

$$\sigma_x = \frac{\sum_{x,y \in C} I^s(x,y)(x-\bar{x})^2}{\sum_{x,y \in C} I^s(x,y)}$$

$$\sigma_y = \frac{\sum_{x,y \in C} I^s(x,y)(y-\bar{y})^2}{\sum_{x,y \in C} I^s(x,y)}$$

where:

$$\bar{x} = \frac{\sum_{x,y \in C} I^s(x,y)x}{\sum_{x,y \in C} I^s(x,y)} \text{ and } \bar{y} = \frac{\sum_{x,y \in C} I^s(x,y)y}{\sum_{x,y \in C} I^s(x,y)}$$

represent a center of mass of said halftone dot along each axis respectively and C denotes a spatial extent of the halftone tile.

13. The system in claim 12, wherein synchronizing said scanned image further comprises:
   for each tile in said uniform periodic tiling,
      estimating a center of said tile based on a center of mass determined for a halftone dot in said current tile; and
      using center of mass coordinates for said current tile and center of mass coordinates of spatially adjacent neighboring tiles surrounding said current tile to estimate a region in scan coordinates corresponding to a next tile to be processed.

14. The system of claim 12, further comprising calculating image moments along additional orientations obtained through a rotation of the x-y coordinate axis.

15. The system in claim 10, further comprising computing a plurality of image moments over a plurality of tiles in an error correction decoder to estimate the message embedded in said image print.

16. The system of claim 10, further comprising performing an error correction on said decoded message.

17. A computer program product for decoding data embedded in an image via halftone dot orientation, the computer program product comprising:
   a non-transitory computer readable media for storing instructions that, when executed on a computer, cause the computer to perform a method comprising:
      scanning an image print containing a data message embedded therein, said message comprising a plurality of single data values, each single data value taking only one unique state;
      synchronizing said scanned image to a uniform periodic tiling utilized for generating said image print to compensate for geometric distortions introduced by print/scan processes performed on said image print;
      associating a unique orientation direction with each of said unique states, each of said unique orientation directions being oriented with respect to a horizontal and vertical axis of said scanned image print;
      defining a uniform periodic tiling for said scanned image; and
      for each of said uniform periodic tiles in said uniform tiling,
         calculating a plurality of image moments for a halftone dot of a current tile, one image moment being calculated along each of said unique orientation directions;
         determining a largest of said calculated moments, said largest moment identifying a dominant orientation direction for said halftone dot; and
         decoding a single data value embedded in said current tile based on which of said unique states is associated said determined dominant orientation direction.

18. The computer program product of claim 17, wherein calculating two of said image moments $(\sigma_x, \sigma_y)$ for unique orientation directions along orthogonal x and y axis comprises:

$$\sigma_x = \frac{\sum_{x,y \in C} I^s(x,y)(x-\bar{x})^2}{\sum_{x,y \in C} I^s(x,y)}$$

-continued $$\sigma_y = \frac{\sum_{x,y \in C} I^s(x,y)(y-\bar{y})^2}{\sum_{x,y \in C} I^s(x,y)}$$

where:

$$\bar{x} = \frac{\sum_{x,y \in C} I^s(x,y)x}{\sum_{x,y \in C} I^s(x,y)} \text{ and } \bar{y} = \frac{\sum_{x,y \in C} I^s(x,y)y}{\sum_{x,y \in C} I^s(x,y)}$$

represent a center of mass of said halftone dot along each axis respectively and C denotes a spatial extent of the halftone tile.

19. The computer program product in claim 17, wherein synchronizing said scanned image comprises:

obtaining a frequency domain representation of image data obtained from said scanned image print;

locating positions of magnitude peaks in said scanned data;

estimating a global rotation and a scaling factor from said magnitude peak positions; and synchronizing said scanned image based on said estimated global rotation and scaling factor.

20. The computer program product in claim 17, further comprising performing an error correction on said decoded message.

* * * * *